(12) United States Patent
Ishino et al.

(10) Patent No.: US 6,646,809 B1
(45) Date of Patent: Nov. 11, 2003

(54) IMAGE DISPLAY APPARATUS, IMAGE DISPLAY SYSTEM, AND IMAGE DISPLAY ELEMENT

(75) Inventors: Toshiki Ishino, Hiratsuka (JP); Takashi Sudo, Utsunomiya (JP); Atsushi Okuyama, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 75 days.

(21) Appl. No.: 09/848,272

(22) Filed: May 4, 2001

(30) Foreign Application Priority Data

May 10, 2000 (JP) .................................... 2000-137454
Jul. 31, 2000 (JP) .................................... 2000-232471
Apr. 5, 2001 (JP) .................................... 2001-107644

(51) Int. Cl.$^7$ ............................................ G02B 27/14
(52) U.S. Cl. ........................ 359/630; 359/631; 359/633
(58) Field of Search ................. 359/630, 631, 359/633, 636, 637; 345/7, 8, 9

(56) References Cited

U.S. PATENT DOCUMENTS

| | | | |
|---|---|---|---|
| 5,414,544 A | 5/1995 | Aoyagi et al. ................. | 359/53 |
| 5,589,956 A | 12/1996 | Morishima et al. ............ | 359/15 |
| 5,625,493 A | 4/1997 | Matsumura et al. ......... | 359/630 |
| 5,703,605 A * | 12/1997 | Takahashi et al. ............. | 345/8 |
| 5,768,025 A | 6/1998 | Togino et al. ............... | 359/633 |
| 6,128,136 A | 10/2000 | Togino et al. ............... | 359/630 |
| 6,310,728 B1 | 10/2001 | Okuyama et al. ........... | 359/633 |
| 2001/0050660 A1 * | 12/2001 | Maeda ........................... | 345/8 |

FOREIGN PATENT DOCUMENTS

| | | |
|---|---|---|
| JP | 9-65245 | 3/1997 |
| JP | 9-266554 | 10/1997 |
| JP | 11-125791 | 5/1999 |
| JP | 2000-098293 | 4/2000 |

* cited by examiner

Primary Examiner—Ricky Mack
(74) Attorney, Agent, or Firm—Fitzpatrick, Cella, Harper & Scinto

(57) ABSTRACT

An image display apparatus includes a light source for emitting illumination light, an image display element for displaying an image by reflecting incident light, an illumination optical element which reflects the illumination light from the light source toward the image display element and through which image light from the image display element is transmitted, an observation optical element for guiding the image light transmitted through the illumination optical element to an eye of an observer, and a light-shielding member for blocking at least one of unnecessary light which is contained in the illumination light from the light source and travels outside an effective image display area of the image display element and unnecessary light which is contained in the image light from the image display element and travels outside an effective observation space.

34 Claims, 24 Drawing Sheets

θ : EXIT ANGLE

IMAGE DISPLAY APPARATUS, IMAGE DISPLAY SYSTEM, AND IMAGE DISPLAY ELEMENT

BACKGROUND OF THE INVENTION

1. Field of the Invention

The present invention relates to an image display apparatus called a head-mounted display or the like, an image display system, and an image display element.

2. Related Background Art

Various types of head-mounted displays have been proposed, which are mounted on the heads or faces of observers to allow them to enjoy images and sounds with great enthusiasm.

A conventional head-mounted display will be described below with reference to FIGS. 29 and 30. A head-mounted display 701 is comprised of a main body 711, band portions 712 formed on the left and right sides of the main body 711, and a bridge 713 formed on the main body 711, and is mounted on the face of an observer like a pair of glasses.

The main body 711 has the image display unit 714 shown in FIG. 30 which is held by a housing 710. A transmissive liquid crystal display element (LCD) 702 displays two-dimensional images. A backlight 703 illuminates the LCD 702. As the backlight 703, a planar fluorescent tube is used. An electric board 704 is used to drive the LCD 702 and backlight 703. An observation prism 705 guides the image displayed on the LCD 702 to an eye 720 of the observer.

The image displayed on the LCD 702 is transmitted through a third surface 708 of the observation prism 705 first, and then totally reflected by a first surface 706. The image light reflected by the first surface 706 is reflected by a second surface 707 of the observation prism 705 again. Thereafter, the image light is transmitted through the first surface 706 and projected on the eye 720 of the observer.

Note that the first surface 706 has a portion that totally reflects image light and a portion through which light is transmitted. The portion that totally reflects image light may be designed to satisfy a total reflection condition by using the difference in refractive index between the observation prism 705 and air. Alternatively, a reflecting film may be formed only within a reflection range by vapor deposition.

According to the head-mounted display having the above arrangement, the image displayed on the LCD 702 can be enlarged by the observation prism 705, and the user can observe the enlarged image (as if he/she watched it on the screen in a movie theater or on the large screen of a TV set).

In this head-mounted display, however, the light emitted from the LCD 702 partly strikes a portion other than the optical effective portion of the observation prism 705 to cause flare and ghosts.

For this reason, an arrangement is disclosed in Japanese Patent Application Laid-Open No. 9-65245, in which the light emerging from the observation prism 705 is partly blocked by a light-shielding plate 717 to prevent flare light and ghost light from reaching the eye 720 of the observer.

In the image display apparatus disclosed in the above reference, however, the light-shielding plate 717 is positioned on the premise that the eyes of the observer are always kept at predetermined positions. If, therefore, the positions of the eyes deviate, flare light and ghost light may be guided to the eyes.

Recently, an image display apparatus has been proposed, which uses a reflective LCD capable of displaying images with higher resolution and higher quality than a transmissive LCD and coping with images output from a PC, DVD player, or the like.

An image display apparatus using such a reflective LCD is disclosed in Japanese Patent Application Laid-Open No. 11-125791. In this apparatus, as shown in FIG. 31, light beams from a light source directly illuminate the reflective LCD, and an image from the reflective LCD is enlarged and displayed as a virtual image by a prism-like optical element to be guided to the eyes of the observer.

In this case, however, the illumination light that illuminates the reflective LCD irradiates the effective image display area on the LCD and a portion outside the area, and reflected light that is unnecessary for image display is also guided to the eyes of the observer. Owing to such unnecessary light, a peripheral portion of the image looks excessively bright or the contrast of the image decreases, resulting in flare, ghosts, and the like. This makes it impossible to observe excellent images.

SUMMARY OF THE INVENTION

It is an object of the present invention to provide an image display apparatus which can effectively remove unnecessary light in image display to improve uniformity of illumination on an image display element and effectively prevent a decrease in the contrast of images and occurrence of flare and ghosts, thereby allowing observation of excellent images.

In order to achieve the above object, according to the present invention, there is provided an image display apparatus comprising a light source for emitting illumination light, an image display element for displaying an image by reflecting the illumination light incident thereon, an illumination optical element which reflects the illumination light from the light source toward the image display element and through which image light from the image display element is transmitted, an observation optical element for guiding the image light transmitted through the illumination optical element to an eye of an observer, and a light-shielding member for blocking at least one of unnecessary light which is contained in the illumination light from the light source and travels outside an effective image display area of the image display element and unnecessary light which is contained in the image light from the image display element and travels outside an effective observation space.

In addition, according to the present invention, there is provided an image display system including an image display apparatus and an image information supply apparatus for supplying image information to the image display apparatus, comprising a light source for emitting illumination light, an image display element for displaying an image by reflecting the illumination light incident thereon, an illumination optical element which reflects the illumination light from the light source toward the image display element and through which image light from the image display element is transmitted, an observation optical element for guiding the image light transmitted through the illumination optical element to an eye of an observer, and a light-shielding member for blocking at least one of unnecessary light which is contained in the illumination light from the light source and travels outside an effective image display area of the image display element and unnecessary light which is contained in the image light from the image display element and travels outside an effective observation space.

Furthermore, according to the present invention, there is provided an image display element for displaying an image by reflecting incident light in an observation side space, comprising a light control layer for controlling transmission/non-transmission of illumination light in accordance with an input image signal, a reflecting layer provided on a rear surface side of the light control layer, and a light-shielding member for blocking incident light, of obliquely applied light, which travels outside an effective image display area of the image display element, and also blocking reflected light outside an effective observation space of the observation side space.

The above and other objects, features, and advantages of the present invention will be apparent from the following detailed description in conjunction with the accompanying drawings and the appended claims.

DETAILED DESCRIPTION OF THE PREFERRED EMBODIMENTS

Embodiments of the present invention will be described below.

(First Embodiment)

Figure 1:
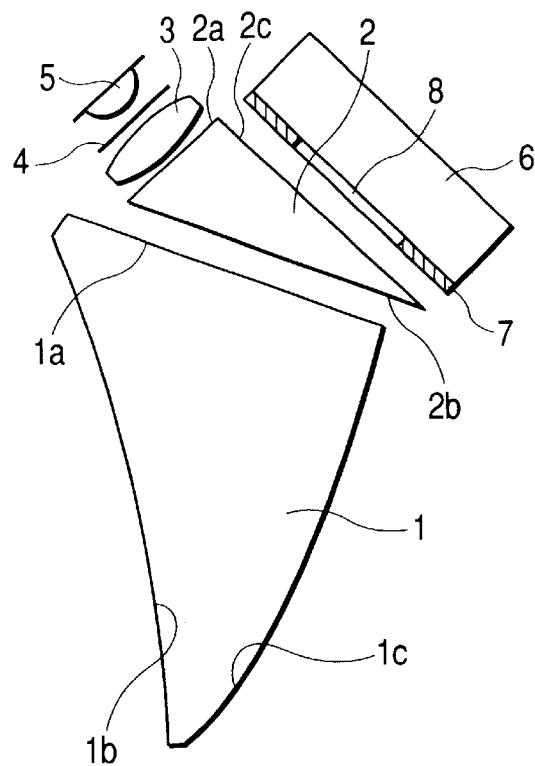
FIG. 1 is a sectional view showing the arrangement of a head-mounted display according to the first embodiment of the present invention.

FIG. 1 is a sectional view of the image display unit portion of a head-mounted display as an image display apparatus according to the first embodiment of the present invention.

Referring to FIG. 1, an observation prism 1 enlarges the image displayed by a reflective image display element 6 and guides the image to an eyeball of an observer. An illumination prism 2 is used to illuminate the image display element 6. A convex lens 3 substantially collimates illumination light.

The illumination light emitted from a light-emitting diode (LED) 5 as a light source is transmitted through a polarizing plate 4 to be converted into linearly polarized light. The light then passes through the convex lens 3 and is guided as an almost parallel light to the illumination prism 2. The illumination light is refracted by a first flat surface 2a of the illumination prism 2 and reaches a third flat surface 2b. Since the third flat surface 2b satisfies a total reflection condition for illumination light, all the illumination light is reflected by the third flat surface 2b and emerges from a second flat surface 2c.

A light-shielding member 7 is placed between the second flat surface 2c and the image display element 6. The light-shielding member 7 is formed by a matte black sheet having an antireflection property and designed to suppress reflection of an illumination light beam and block it (prevent it from being transmitted). The light-shielding member 7 has an opening portion 8 in a portion corresponding to the image display range to allow the illumination light beam to reach only the effective image display area (to be simply referred to as an image display area hereinafter) of the image display element 6, and a portion other than the opening portion is formed to suppress reflection of illumination light that illuminates the light-shielding member 7.

The illumination light beam that has passed through the opening portion 8 of the light-shielding member 7 and reached the image display element 6 is reflected with image information by the image display element 6 and strikes the flat surface 2c of the illumination prism again. This light beam is transmitted through the third flat surface 2b and incident on a first surface 1a of the observation prism 1.

The image light beam incident from the first surface 1a of the observation prism 1 is reflected by second and third surfaces 1b and 1c of the observation prism 1, emerges from the second surface 1b of the observation prism, and is guided to the eyeball of the observer. This allows the observer to observe the image displayed on the image display element 6.

The portion other than the opening portion 8 of the light-shielding member 7 blocks unnecessary light that is contained in the illumination light and travels outside the image display area of the image display element 6 and unnecessary light that is contained in the image light from the image display element 6 and travels outside the effective observation space.

According to the first embodiment described above, by placing the light-shielding member 7 between the illumination prism 2 and the image display element 6, reflection of unnecessary light outside the image display area is suppressed to make the peripheral portion of the image become sufficiently dark, thereby improving the contrast of the image to be observed. This allows the observer to comfortably observe the image.

In addition, in the first embodiment, the matte black sheet member having the antireflection property is used as a light-shielding member. However, the present invention is not limited to this member. For example, a matte black film may be formed on the surface of the image display element 6 by printing or coating. This makes it possible to obtain the same effect as described above.

(Second Embodiment)

Figure 2:
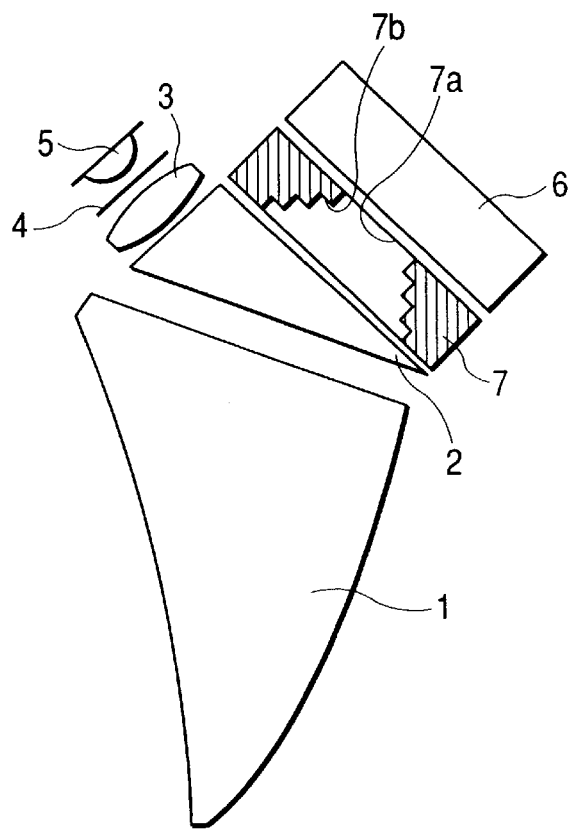
FIG. 2 is a sectional view showing the arrangement of a head-mounted display according to the second embodiment of the present invention.

FIG. 2 shows the arrangement of the image display unit portion of a head-mounted display as an image display apparatus according to the second embodiment of the present invention. Note that the same reference numerals as in the first embodiment denote the same constituent elements in the second embodiment, and a description thereof will be omitted.

Referring to FIG. 2, a light-shielding member 7 prevents illumination light from a light source (LED) 5 from being unnecessarily reflected by an image display element 6. The light-shielding member 7 is formed by a matte black mold member having an antireflection property, and has a linear light-shielding portion 7b having a terraced shape, which is formed around an opening portion 7a that allows illumination light to pass therethrough.

In the second embodiment, by placing the light-shielding member 7 between the illumination prism 2 and the image display element 6, reflection of unnecessary light outside the image display area is suppressed to make the peripheral portion of the image become sufficiently dark, thereby improving the contrast of the image to be observed. This allows the observer to comfortably observe the image.

(Third Embodiment)

Figure 3:
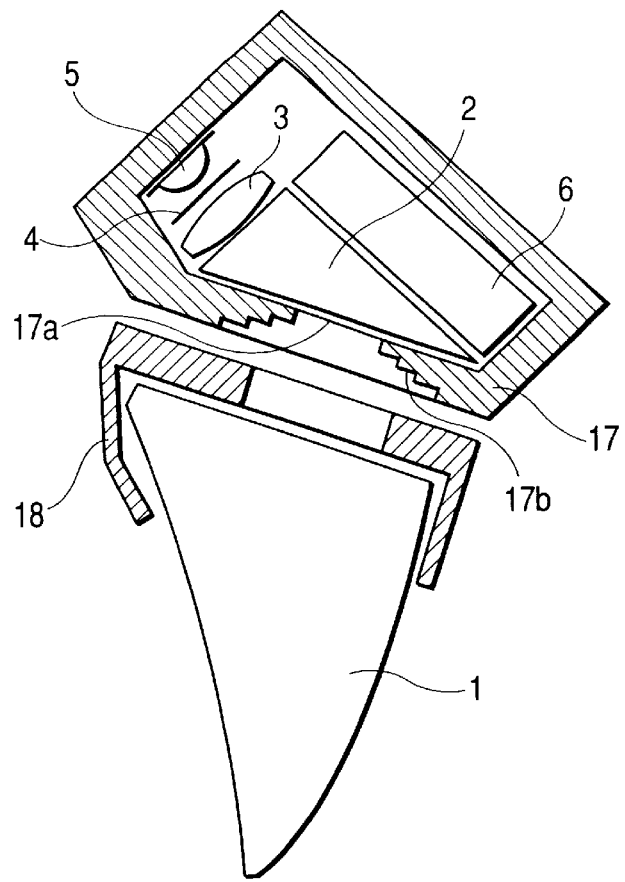
FIG. 3 is a sectional view showing the arrangement of a head-mounted display according to the third embodiment of the present invention.

FIG. 3 shows the arrangement of the image display unit portion of a head-mounted display as an image display apparatus according to the third embodiment of the present invention. Note that the same reference numerals as in the first embodiment denote the same constituent elements in the third embodiment, and a description thereof will be omitted.

Referring to FIG. 3, a display system holding member 17 integrally holds an image display element 6, light source (LED) 5, polarizing plate 4, illumination lens 3, and illumination prism 2. A linear light-shielding portion 17b having undergone antireflection processing is formed around an opening portion 17a that allows an image light beam to pass therethrough (between the illumination prism 2 and an observation prism 1).

This linear light-shielding portion 17b can prevent unnecessary light of image light from emerging outside the effective observation space of the space on the observation prism 1 side, thereby providing a comfortable observation image upon suppressing unnecessary reflection of the image light.

A prism holding member 18 is used to hold the observation prism 1.

(Fourth Embodiment)

Figure 4:
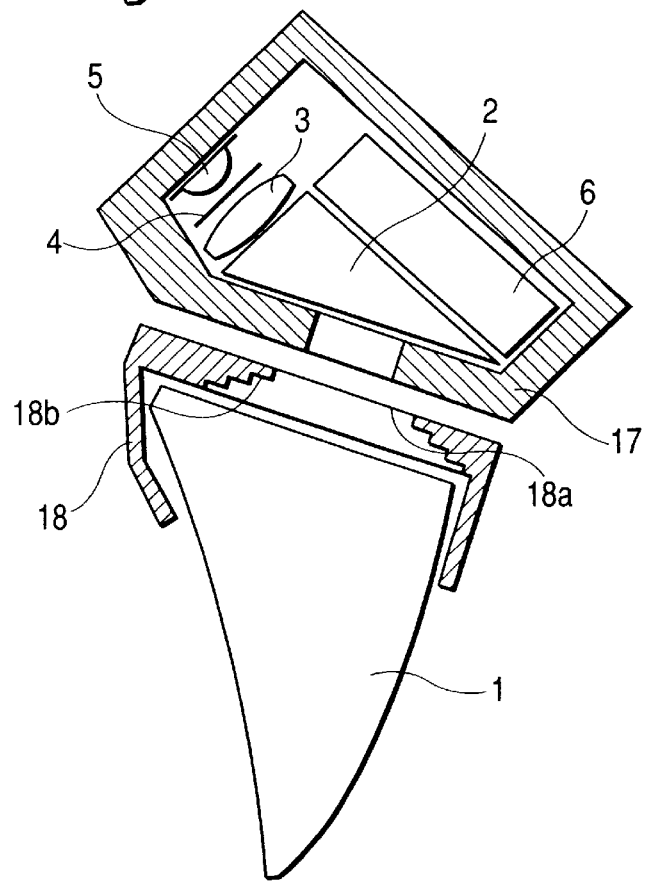
FIG. 4 is a sectional view showing the arrangement of a head-mounted display according to the fourth embodiment of the present invention.

FIG. 4 shows the arrangement of the image display unit portion of a head-mounted display as an image display apparatus according to the fourth embodiment of the present invention. Note that the same reference numerals as in the first embodiment denote the same constituent elements in the fourth embodiment, and a description thereof will be omitted.

In a prism holding member 18 for holding an observation prism 1, a linear light-shielding portion 18b having undergone antireflection processing is formed around an opening portion 18a that allows an image light beam to pass therethrough (between an illumination prism 2 and the observation prism 1). A display system holding member 17 is a display system holding member used to integrally hold an image display element 6, a light source (LED) 5, a polarizing plate 4, an illumination lens 3, and the illumination prism 2.

By forming the linear light-shielding portion 18b directly in the prism holding member 18, unnecessary reflection of image light is suppressed, thereby providing a comfortable image.

(Fifth Embodiment)

Figure 5:
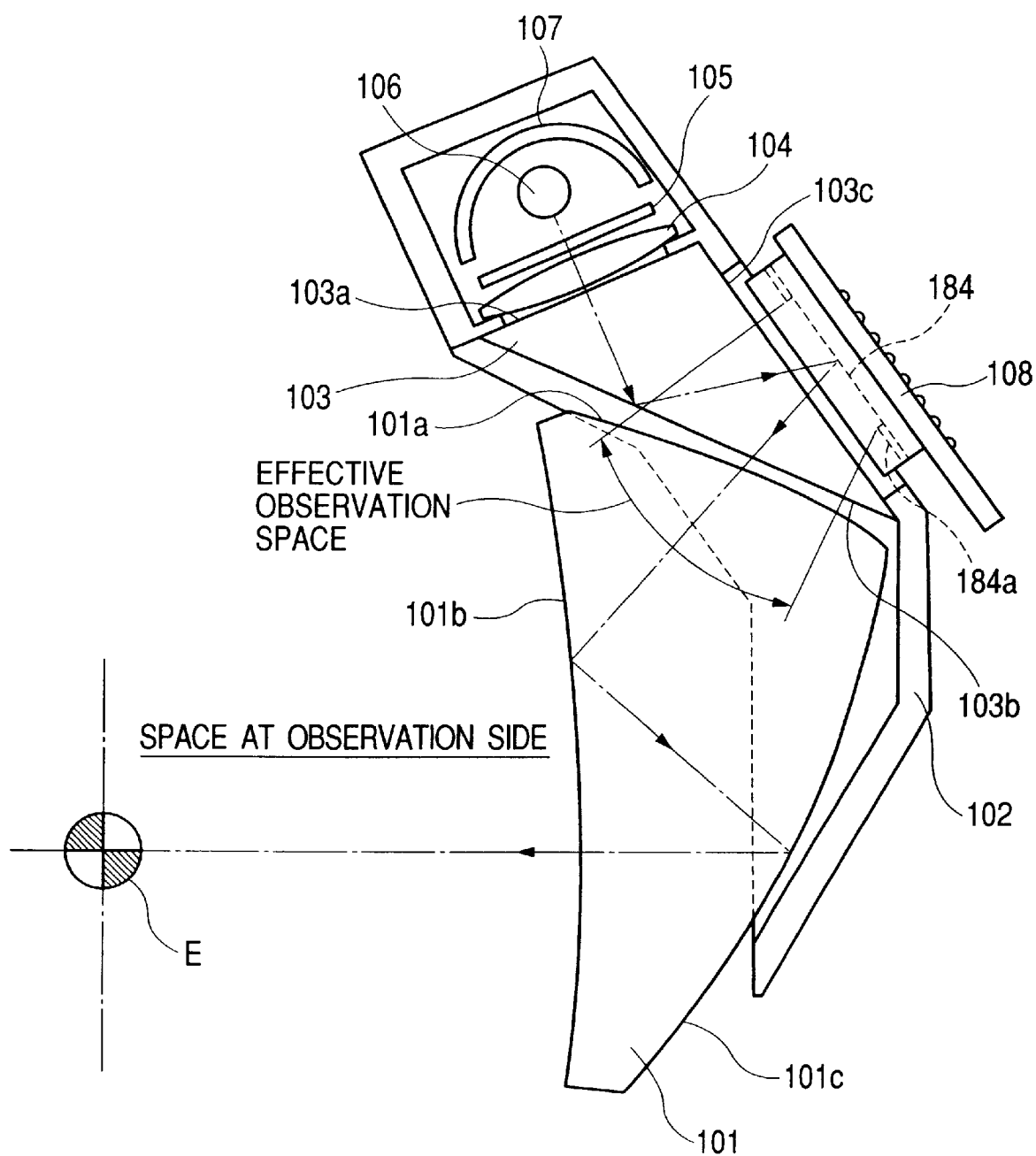
FIG. 5 is a sectional view showing the arrangement of a head-mounted display according to the fifth embodiment of the present invention.

FIG. 5 shows the arrangement of a head-mounted display as an image display apparatus according to the fifth embodiment of the present invention. Referring to FIG. 5, an illumination light source 106 emits illumination light, and a reflector 107 reflects the illumination light, emitted backward from the illumination light source 106, forward.

A polarizing plate 105 is used to convert the illumination light from the illumination light source 106 or reflector 107 into linearly polarized light. A convex lens 104 substantially collimates the illumination light having passed through the polarizing plate 105.

A reflective liquid crystal display element (to be simply referred to as an LCD hereinafter) 108 serves as an image display element.

An illumination prism 103 (illumination optical system) guides the illumination light, which has passed through the convex lens 104, to the LCD 108. The illumination prism 103 is comprised of a first surface 103a on which illumination light from the convex lens 104 is incident, a second surface (entrance/exit surface) 103c from which illumination light emerges toward the LCD 108 and on which the image light reflected by the LCD 108 is incident again, and a third surface 103b which totally reflects the illumination light incident from the first surface 103a toward the second surface 103c and allows the image light incident from the second surface 103c to pass therethrough.

An observation prism 101 is placed in a space at the observation side, in which the image light reflected by the LCD 108 travels, together with the illumination prism 103, and guides the light, reflected by the LCD 108 and transmitted through the illumination prism 103, to an eye E of an observer.

This observation prism 101 includes a first surface 110a on which the light transmitted through the illumination prism 103 is incident, a second surface 101b that totally reflects the light incident from the first surface 101a, and a third surface 101c that reflects the light reflected by the second surface 101b toward the second surface 101b again. The light reflected by the third surface 101c is transmitted through the second surface 101b and reaches the eye E of the observer.

The observation prism 101 has the optical effect of enlarging the image displayed on the LCD 108 and projecting it on the eye E of the observer by causing the light incident from the LCD 108 onto the first surface 101a to be reflected a plurality of number of times by surfaces having optical powers. In addition, both the first and third surfaces 101a and 101c of the observation prism 101 are formed by free-form surfaces which are rotationally asymmetrical aspherical surfaces, and the observation prism 101 has the optical effect of properly correcting various aberrations in the image formed by light incident on these surfaces.

A housing 102 holds the respective constituent elements, i.e., the illumination prism 103, illumination light source 106, observation prism 101, and LCD 108.

Figure 6:
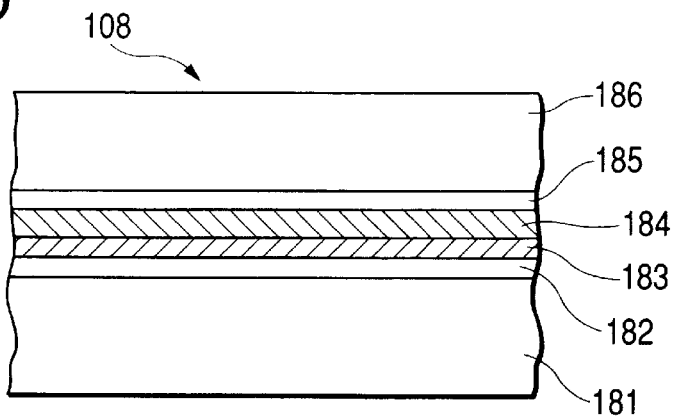
FIG. 6 is a sectional view showing a reflective LCD used in the head-mounted display in FIG. 5.

The basic structure of the reflective LCD 108 will be described next with reference to FIG. 6. Referring to FIG. 6, a protective glass member 181 is located on the front surface side (illumination prism side), and a protective glass member 186 is located on the rear surface side.

A transparent electrode (ITO) 182 is stacked on the rear surface of the protective glass member 181. A liquid crystal layer 183 as a light control layer is stacked on the rear surface of the ITO 182. In this embodiment, a TN liquid crystal is used for the liquid crystal layer.

A reflecting layer 184 is stacked on the rear surface of the liquid crystal layer 183. A silicon substrate 185 on which an electric circuit for driving the liquid crystal layer 183 through the reflecting layer 184 is formed by a semiconductor technique, and is electrically connected to the reflecting layer 184.

In the LCD 108 having the above arrangement, when a voltage is applied to the ITO 182 in accordance with an image signal input from an image information supply apparatus such as a PC or DVD player, an electric field is generated between the ITO 182 and the reflecting layer 184. The liquid crystal in the liquid crystal layer 183 is driven by this electric field to allow the light incident on the liquid crystal layer 183 to pass therethrough or inhibit it from passing therethrough. The light transmitted through the liquid crystal layer 183 is reflected by the reflecting layer 184 and is transmitted through the liquid crystal layer 183, ITO 182, and protective glass member 181 again to emerge from the LCD 108.

The reflecting layer 184 has an effective image display area excluding a peripheral portion on which electrodes are arranged, a portion that overlaps a portion of the liquid crystal layer 183 which is irrelevant to image display. The illumination light incident on this area is reflected as light (image light) having image information and emerges from the LCD 108. This light is then incident on the illumination prism 103 and observation prism 101.

In this case, of the light that emerges from the LCD 108 and strikes the illumination prism 103 and observation prism 101, light incident on predetermined optical effective portions of the second surface 103c of the illumination prism 103 and the first surface 101a of the observation prism 101 are subjected to the optical effects of the illumination prism 103 and observation prism 101 described above. Light incident on portions other than the optical effective portions may cause flare or ghosts upon diffusion or the like.

When the light incident on a portion of the reflecting layer 184 which is located outside the effective image display area is incident on the optical effective portion of the second surface 103c of the illumination prism 103 or the first surface 101a of the observation prism 101, the peripheral portion of the observation image becomes bright, resulting in a decrease in the contrast of the observation image.

This phenomenon will be described in more detail below with reference to FIG. 7B. In the head-mounted display of this embodiment, illumination light is made to strike the LCD 108 obliquely through the illumination prism 103. For this reason, if illumination light is incident on a portion of the reflecting layer 184 which is located outside the effective image display area, light having no image information is reflected toward the optical effective portions of the second surface 103c of the illumination prism 103 and the first surface 101a of the observation prism 101 (i.e., the effective observation space determined by the sizes and shapes of these optical effective portions), as indicated by "(1)" in FIG. 7B, or reflected toward portions of the second surface 103c of the illumination prism 103 and the first surface 101a of the observation prism 101 which are located outside the optical effective portion (i.e., outside the effective observation space), as indicated by "(2)" in FIG. 7B.

The light indicated by "(1)" makes the peripheral portion of the observation image bright to cause a decrease in the contrast of the observation image. The light indicated by "(2)" causes flare and ghosts.

Figure 7A:
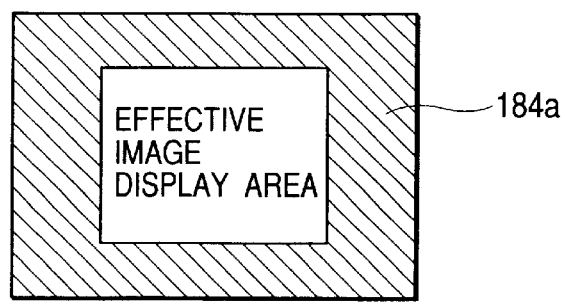
FIGS. 7A and 7B are views for explaining the antireflection portion formed on a reflecting layer of the LCD.
Figure 7B:
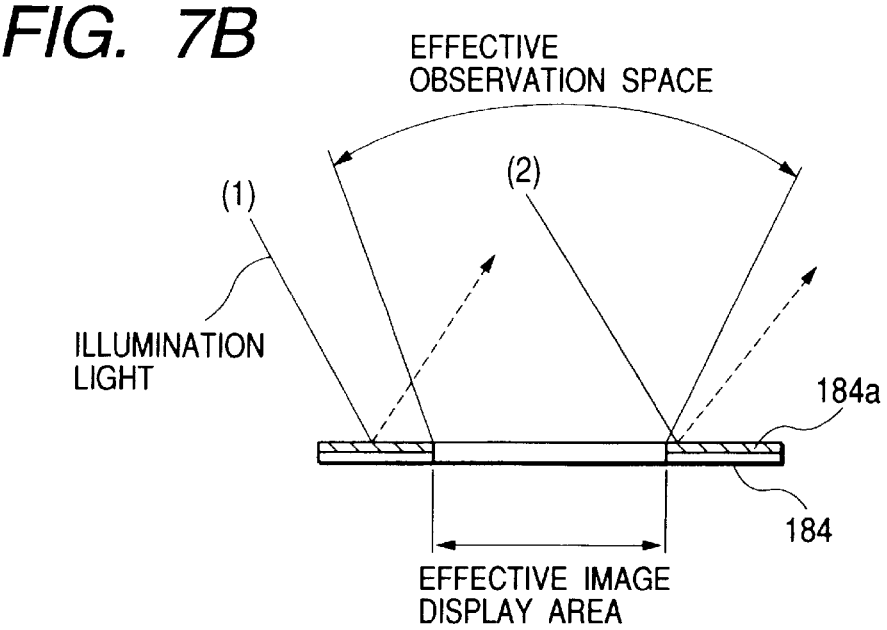

In the fifth embodiment, therefore, the portion other than the above effective image display area on the reflecting layer 184 (on the liquid crystal layer 183 side) is formed into a portion (light-shielding member) 184a having undergone antireflection processing, as shown in FIGS. 7A and 5.

For example, in antireflection processing, a portion of the metal surface of the reflecting layer 184 which is located outside the above effective image display area is oxidized to prevent reflection of incident light. However, other methods may also be used. For example, a thin light-shielding layer may be formed between the liquid crystal layer 183 and the reflecting layer 184.

This structure reliably prevents illumination light incident on the portion of the reflecting layer 184 which is located outside the effective image display area from being reflected as indicated by "(1)" and "(2)".

As described above, according to the fifth embodiment, since the antireflection portion (light-shielding member) 184a is formed outside the effective image display area on the reflecting layer 184, the peripheral portion of an observation image can be made sufficiently dark, thus increasing the contrast of the observation image. In addition, since flare and ghosts caused by reflection of light by the reflecting layer 184 can be prevented, excellent images without them can be observed.

Furthermore, according to the fifth embodiment, since no positional offset occurs in principle between the outer edge of the effective image display area and the inner edge of the antireflection portion 184*a*, no vignetting of an image is caused by the antireflection portion 184*a*, and there is no possibility that the quality of the observation image deteriorates.

(Sixth Embodiment)

Figure 8:
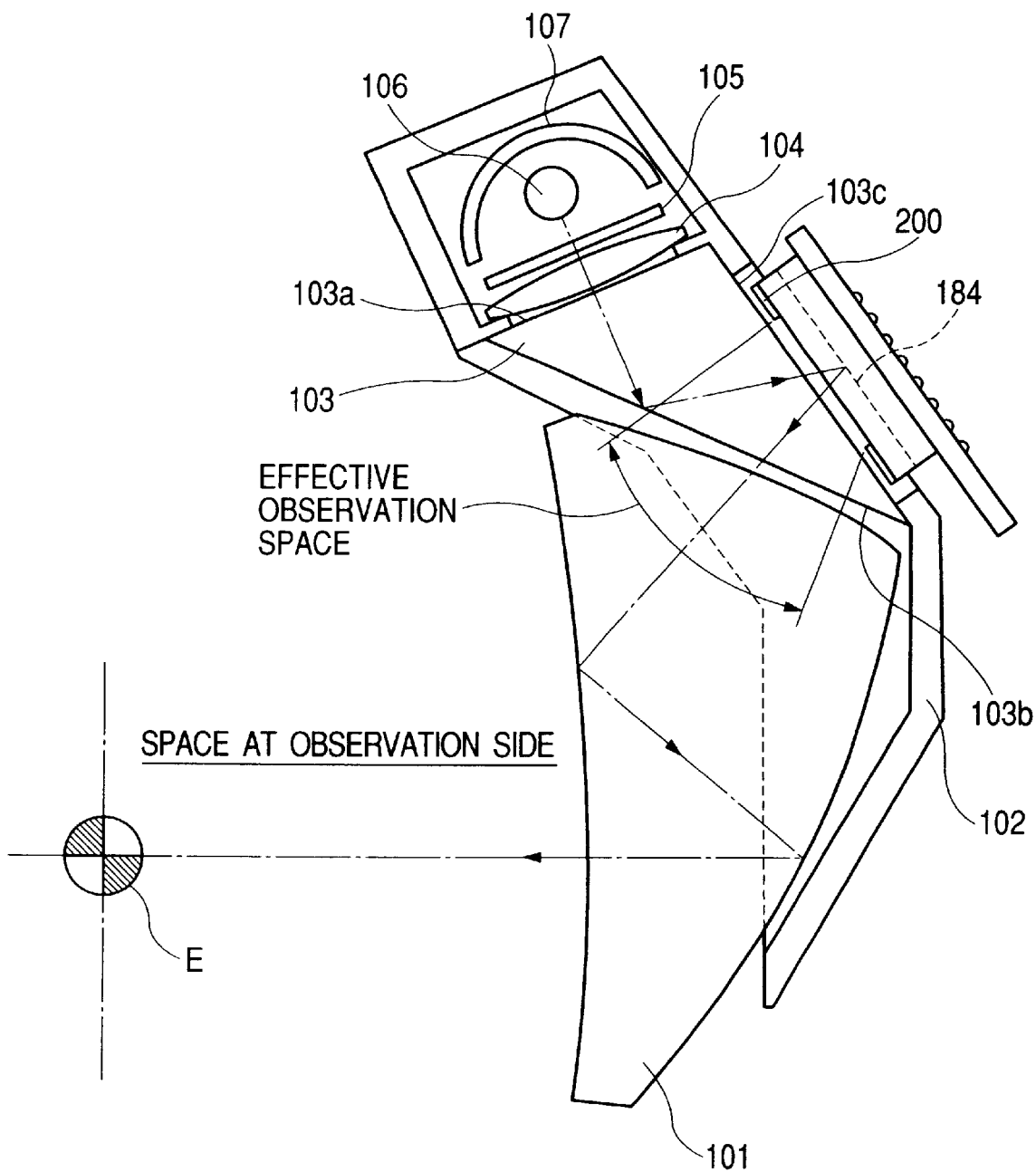
FIG. 8 is a sectional view showing the arrangement of a head-mounted display according to the sixth embodiment of the present invention.

FIG. 8 shows the arrangement of the image display unit portion of a head-mounted display as an image display apparatus according to the sixth embodiment of the present invention. Note that since the basic arrangement of the head-mounted display of this embodiment is the same as that of the fifth embodiment, the same reference numerals as in the fifth embodiment denote the same constituent elements in the sixth embodiment, and a description thereof will be omitted.

In the fifth embodiment, the antireflection portion 184*a* is placed as a light-shielding member in the LCD 108. In the sixth embodiment, a light-shielding member 200 is formed on the surface of an LCD 108 (i.e., the surface of a protective glass member 181).

This light-shielding member 200 is formed by forming a matte black film having an antireflection property on the surface of the protective glass member 181 by printing or coating. Alternatively, for example, a light-shielding sheet may be bonded on the surface of the protective glass member 181.

By forming the light-shielding member 200 on the protective glass member 181 by printing, coating, bonding, or the like, the following effects can be easily obtained as compared with the case where the antireflection portion 184*a* is placed in the LCD 108 as in the fifth embodiment.

Figure 9:
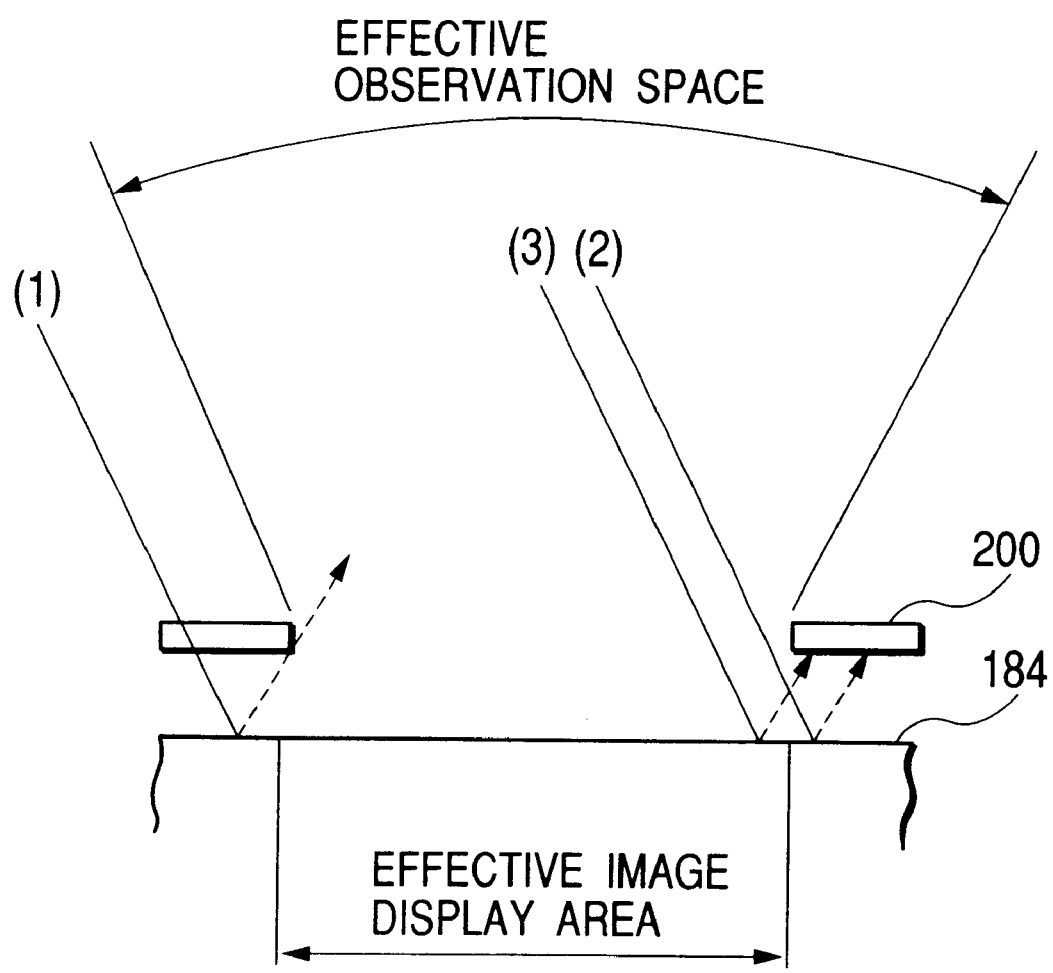
FIG. 9 is a view for explaining a light-shielding portion formed in the head-mounted display according to the sixth embodiment in FIG. 8.

In the sixth embodiment, as shown in FIG. 9, the light-shielding member 200 blocks illumination light (1) that tries to strike a portion, of a reflecting layer 184 of the LCD 108, which is located outside the effective image display area. As in the fifth embodiment, therefore, this can prevent illumination light from striking a portion, of the reflecting layer 184*a* of the LCD 108, which is located outside the effective image display area and causing reflection of light inside or outside the effective observation space.

In the sixth embodiment, the light-shielding member 200 is separated from the reflecting layer 184 by the thickness of a liquid crystal layer 183, an ITO 182, and the protective glass member 181. This structure may allow light to pass between the reflecting layer 184 and the light-shielding member 200, strike the portion other than the effective image display area of the reflecting layer 184, and be reflected outside the effective observation space, as indicated by "(2)" in FIG. 9, or may allow light to strike the effective image display area of the reflecting layer 184, pass between the reflecting layer 184 and the light-shielding member 200, and be reflected outside the effective observation space, as indicated by "(3)". However, the light-shielding member 200 prevents these light beams indicted by "(2)" and "(3)" from emerging from the LCD 108.

The sixth embodiment, therefore, can prevent the peripheral portion from being made bright by light like that indicated by "(1)" and can also prevent light like that indicated by "(2)" from producing flare and ghosts, thus increasing the contrast of observation images and allowing the observer to observe excellent images without flare and ghosts.

In addition, the formation of the light-shielding member 200 on the surface of the LCD 108 makes it difficult to produce vignetting due to the positional offset of the light-shielding member 200. There is hardly any possibility of a deterioration in the quality of an observation image.

(Seventh Embodiment)

Figure 10:
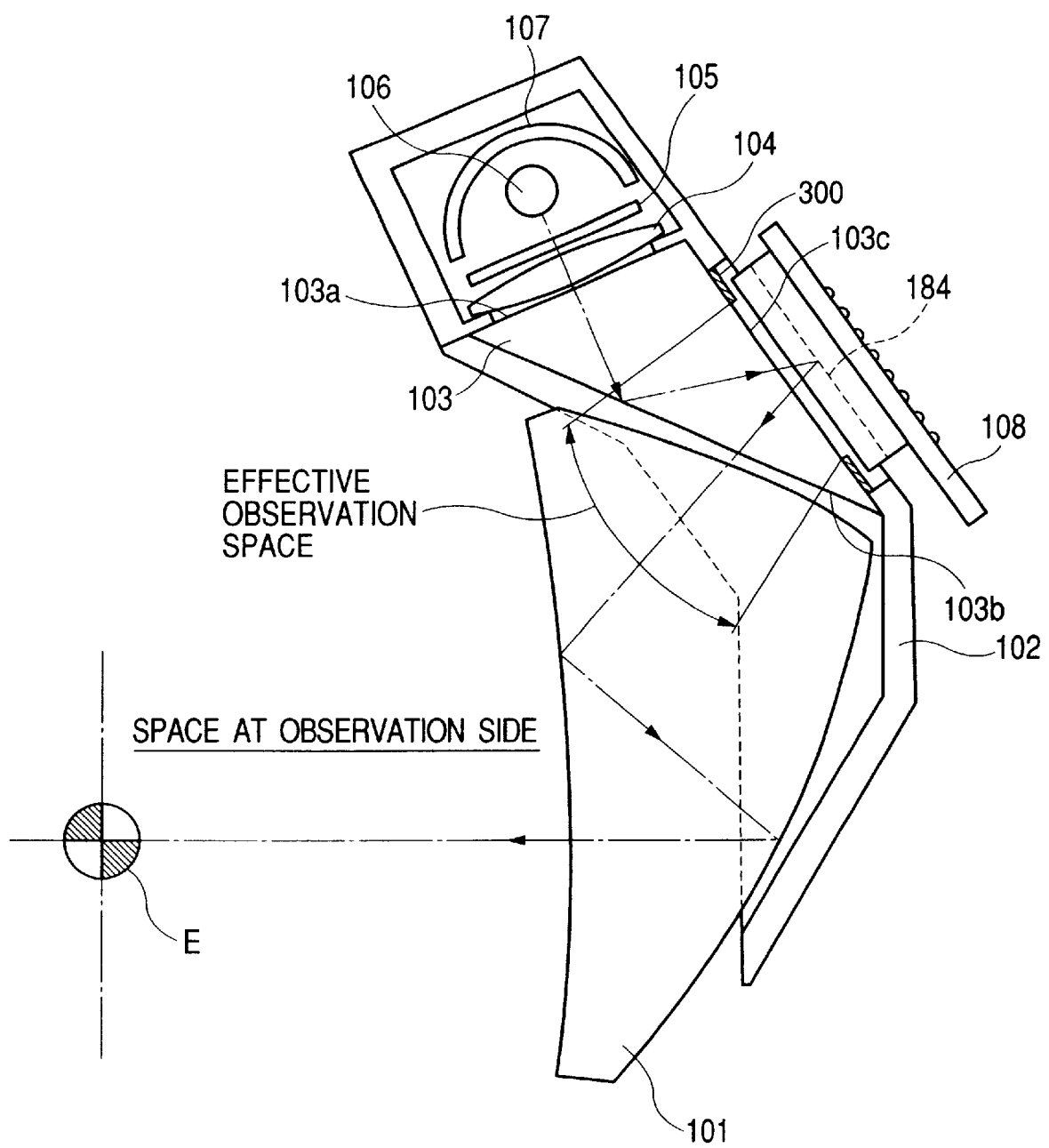
FIG. 10 is a sectional view showing the arrangement of a head-mounted display according to the seventh embodiment of the present invention.

FIG. 10 shows the arrangement of the image display unit portion of a head-mounted display as an image display apparatus according to the seventh embodiment of the present invention. Note that since the basic arrangement of the head-mounted display of this embodiment is the same as that of the fifth embodiment, the same reference numerals as in the fifth embodiment denote the same constituent elements in the seventh embodiment, and a description thereof will be omitted.

In the sixth embodiment described above, the light-shielding member 200 is formed on the surface of the LCD 108. In the seventh embodiment, however, a light-shielding member 300 is formed on a second surface (entrance/exit surface) 103*c* of an illumination prism 103.

This light-shielding member 300 is formed by forming a matte black film having an antireflection property on the second surface 103*c* by printing, coating, or the like. Alternatively, for example, a light-shielding sheet may be bonded as the light-shielding member 300 on the second surface 103*c*.

By forming the light-shielding member 300 on the illumination prism 103 by printing, coating, bonding, or the like, the same effects as those of the sixth embodiment can be easily obtained.

In addition, according to the seventh embodiment, since the light-shielding member 300 is formed on the illumination prism 103, even if printing or bonding of the light-shielding member 300 fails, this process can be redone by cleaning the illumination prism 103 and bonding a light-shielding sheet again.

(Eighth Embodiment)

Figure 11:
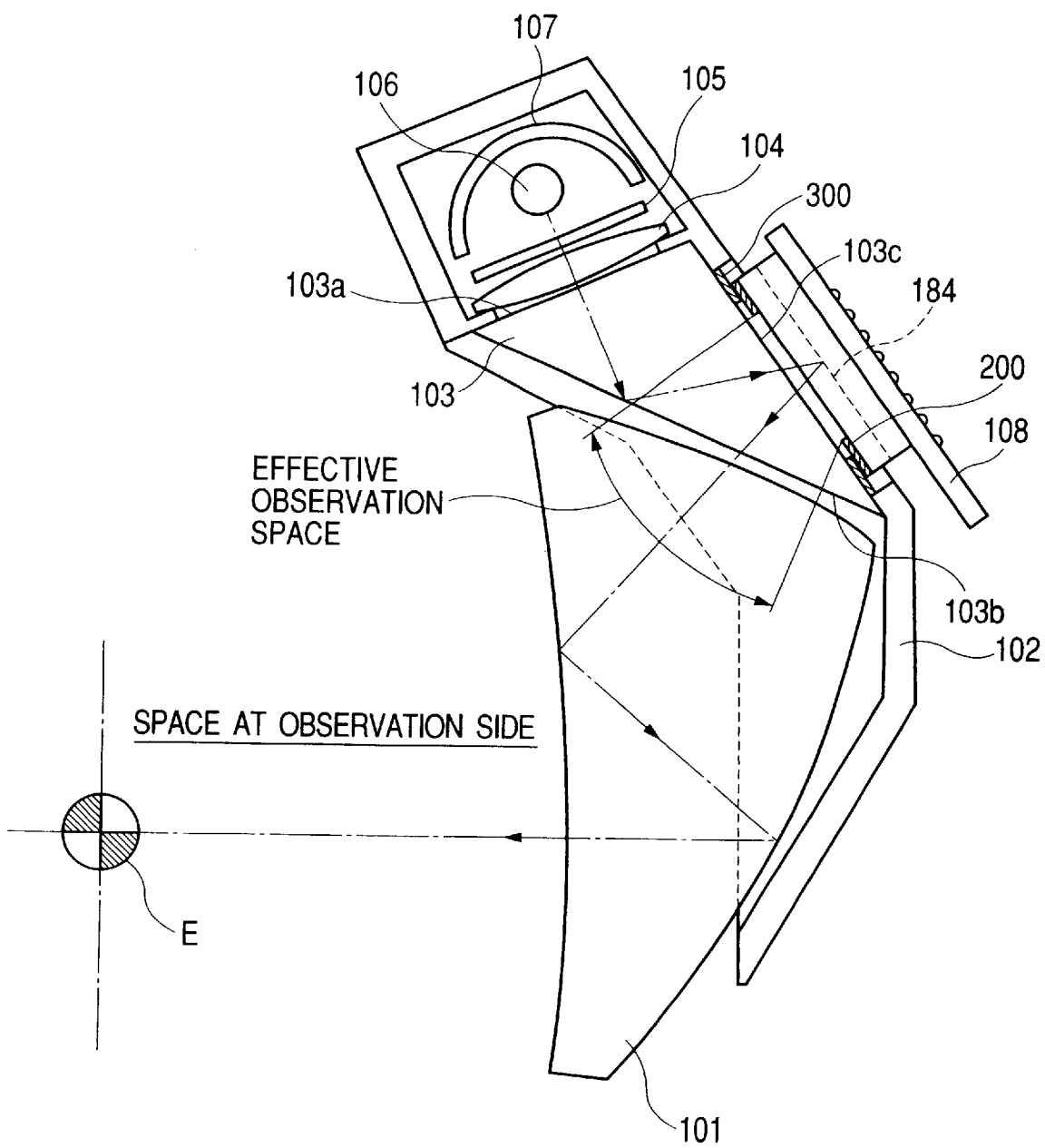
FIG. 11 is a sectional view showing the arrangement of a head-mounted display according to the eighth embodiment of the present invention.

FIG. 11 shows the arrangement of the image display unit portion of a head-mounted display as an image display apparatus according to the eight embodiment of the present invention. Note that since the basic arrangement of the head-mounted display of this embodiment is the same as that of the fifth embodiment, the same reference numerals as in the fifth embodiment denote the same constituent elements in the eighth embodiment, and a description thereof will be omitted.

Figure 12A:
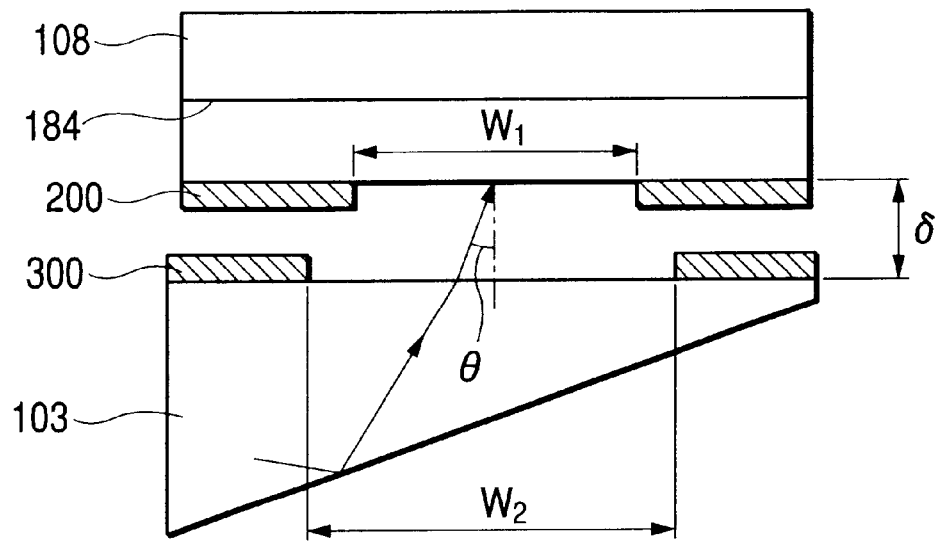
FIGS. 12A and 12B are schematic views showing the relationship between the opening sizes of light-shielding portions in the head-mounted display according to the eighth embodiment in FIG. 11.

In the eighth embodiment, as shown in FIG. 12A in detail, a light-shielding member (first light-shielding member) 200 is provided on the surface of an LCD 108 as in the sixth embodiment, and a light-shielding member (second light-shielding member) 300 is also provided on a second surface 103*c* of an illumination prism 103 as in the seventh embodiment.

The relationship between the opening size of the light-shielding member 200 and the opening size of the light-shielding member 300 in the eighth embodiment will be described below.

Letting w1 be the opening size of the light-shielding member 200, w2 be the opening size of the light-shielding member 300, $\delta$ be the distance between the light-shielding member 200 and the light-shielding member 300, and $\theta$ be the incident angle of illumination light on the LCD 108, the following inequality is satisfied:

$$w2 > w1 + 2\delta \sin\theta \quad (1)$$

Setting the opening sizes of the light-shielding members 200 and 300 sequentially formed in the propagating direction of light reflected by the LCD 108 in this manner can prevent a deterioration in the quality of an observation image due to vignetting of the image by the light-shielding members 200 and 300.

Figure 12B:
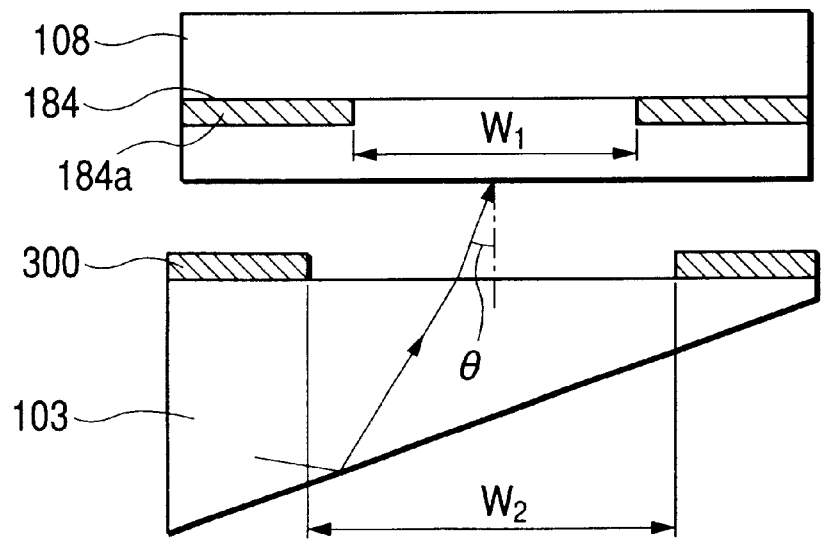

As shown in FIG. 12B, an antireflection portion 184a may be formed as a first light-shielding member on a reflecting layer 184 of the LCD 108 as in the fifth embodiment, and the light-shielding member 300 may be formed as a second light-shielding member on the second surface 103c of the illumination prism 103 as in the seventh embodiment. In this case, it suffices if the opening size w1 of the antireflection portion 184a and the opening size w2 of the light-shielding member 300 satisfy inequality (1).

The antireflection portion 184a may be formed as a first light-shielding member on the reflecting layer 184 of the LCD 108 as in the fifth embodiment, and the light-shielding member 200 may be formed as a second light-shielding member on the surface of the LCD 108 as in the sixth embodiment. In this case, it suffices if the opening size w1 of the antireflection portion 184a and the opening size w2 of the light-shielding member 200 satisfy inequality (1).

In the eighth embodiment only the first and second light-shielding members are formed. However, other light-shielding member may also be formed. For example, light-shielding members may be formed on three portions, i.e., the reflecting layer 184 of the LCD 108, the surface of the LCD 108, and the second surface 103c of the illumination prism 103.

(Ninth Embodiment)

Figure 13:
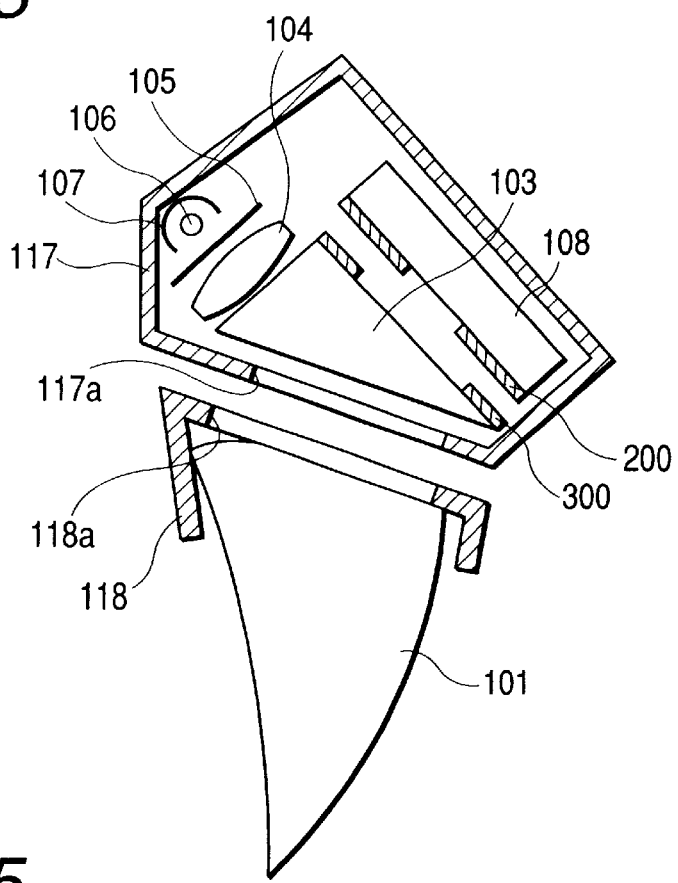
FIG. 13 is a sectional view showing the arrangement of a head-mounted display according to the ninth embodiment of the present invention.

FIG. 13 shows the arrangement of the image display unit portion of a head-mounted display as an image display apparatus according to the ninth embodiment of the present invention. Note that since the basic arrangement of the head-mounted display of this embodiment is the same as that of the fifth embodiment, the same reference numerals as in the fifth embodiment denote the same constituent elements in the ninth embodiment, and a description thereof will be omitted.

In the fifth to eighth embodiments, the contrast of an observation image is increased and flare and the like are prevented by only providing a light-shielding member for one or both of the LCD 108 and illumination prism 103. In the ninth embodiment, an arrangement for increasing the contrast of an observation image and preventing flare and the like is added to this means.

Referring to FIG. 13, a display system holding member 117 integrally holds an illumination light source 106, reflector 107, polarizing plate 105, convex lens 104, illumination prism 103, and LCD 108. A prism holding member 118 holds an observation prism 101.

Light-shielding portions 117a and 118a serving as light-shielding members for blocking light components, of light emerging from the illumination prism 103 toward the observation prism 101, which decrease the contrast of an observation image and cause flare and the like, are respectively formed on the display system holding member 117 and prism holding member 118.

By forming a plurality of light-shielding portions (light-shielding members) in optical paths through which light reflected by the LCD 108 passes, an increase in the contrast of an observation image and prevention of flare and the like can be achieved more effectively than in the fifth to eighth embodiments.

Although the ninth embodiment has exemplified the case where the light-shielding portions 117a and 118a are formed on both the display system holding member 117 and prism holding member 118, a light-shielding portion (light-shielding member) may be formed on only one of the display system holding member 117 and prism holding member 118.

(Tenth Embodiment)

Figure 14:
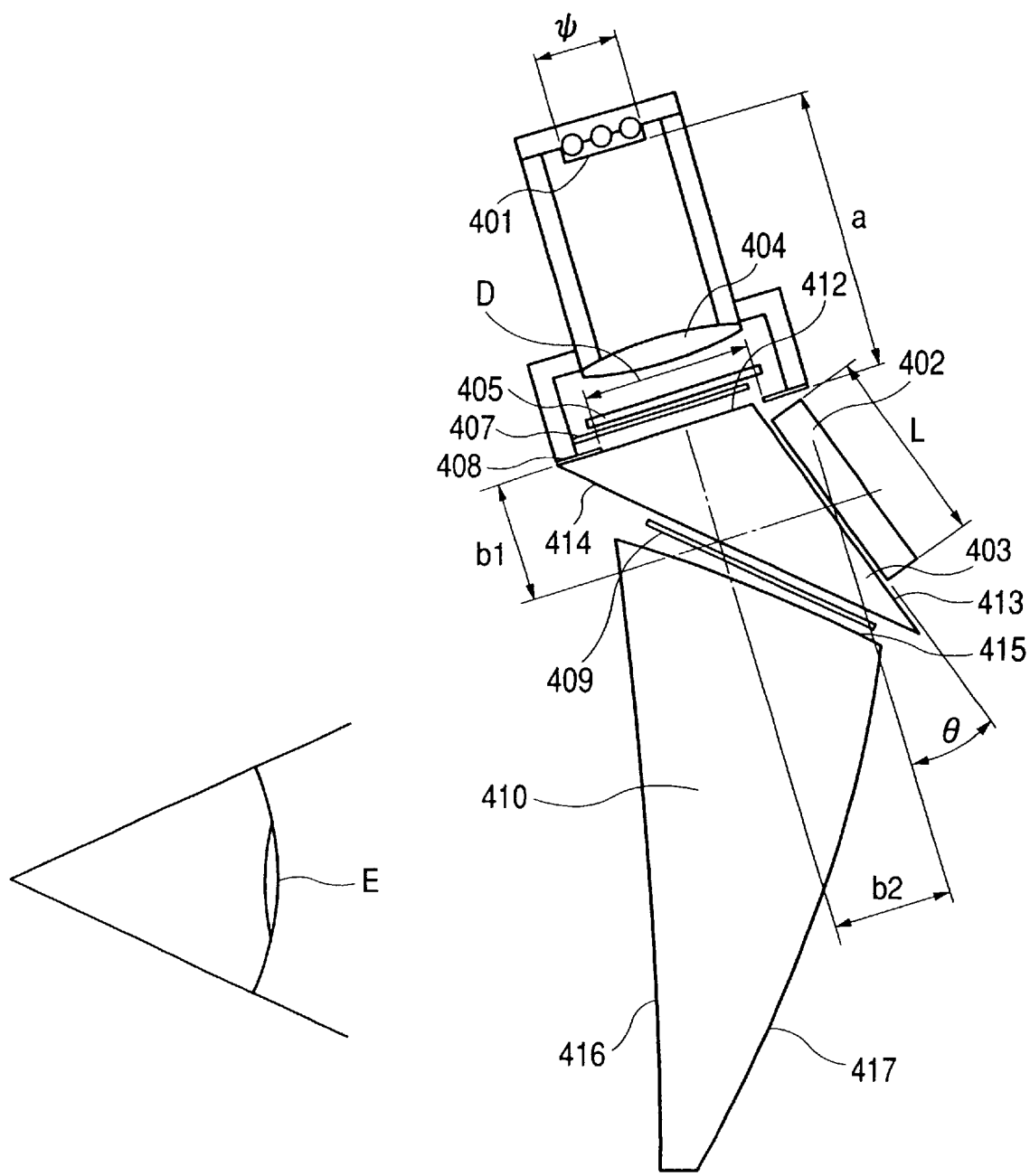
FIG. 14 is a sectional view showing the arrangement of a head-mounted display according to the tenth embodiment of the present invention.

FIG. 14 is a view for explaining the arrangement of a head-mounted display as an image display apparatus according to the tenth embodiment of the present invention. This apparatus includes a light source 401 for emitting RGB light, a reflective liquid crystal display panel (LCD) 402 serving as an image display element, an illumination prism 403, a convex lens 404, a diffusion plate 405, a first polarizing plate 407, a light-shielding member 408 having an antireflection property, a second polarizing plate 409, and an observation prism 410. FIG. 14 also shows an eye E of an observer.

The light emitted from the light source 401 is incident on the convex lens 404 to be converted into a light beam parallel to the optical axis of the convex lens 404. This light is incident on the diffusion plate 405 to emerge therefrom in various directions and transmitted through the first polarizing plate 407. Part of the light beam is blocked by the light-shielding member 408 bonded to a first surface 412 of the illumination prism 403, while the remaining part of the light beam is guided to the illumination prism 403. The light guided to the illumination prism 403 is transmitted through the first surface 412 of the illumination prism 403 and reflected by a third surface 414, transmitted through a second surface 413, and incident on the LCD 402, thereby illuminating the image display area of the LCD 402. The light beam incident on the LCD 402 is reflected by the LCD 402 and transmitted as image light through the second surface 413 of the illumination prism 403 again. The image light is transmitted through the third surface 414 and reaches the observation prism 410 through the second polarizing plate 409.

The illumination prism 403 is placed between the observation prism 410 and the LCD 402, and the third surface 414 on the observation prism 410 side and the second surface 413 on the LCD 402 side are set at predetermined angles. In this illumination prism 403, illumination light and image light partly pass through the same area between the second surface 413 and the third surface 414.

The observation prism 410 in the tenth embodiment is comprised of three surfaces. The light which is reflected by the LCD 402 and transmitted through the illumination prism 403 is transmitted through a first surface 415 of the observation prism 410, reflected by second and third surfaces 416 and 417, transmitted through the second surface 416, and reaches the eye E of the observer.

Figure 15:
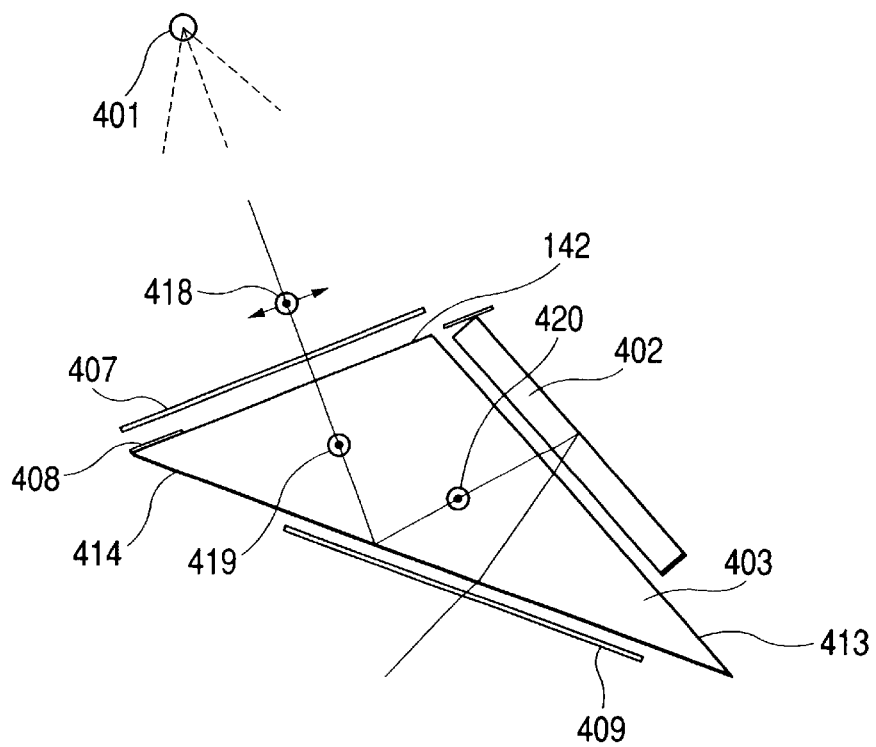
FIG. 15 is a view for explaining polarization state in an illumination system in the tenth embodiment in FIG. 14.

As shown in FIG. 15, the polarizing plates 407 and 409 are respectively provided on the entrance and exit sides of the LCD 402. Nonpolarized light 418 from the light source 401 is aligned in a first polarizing direction 419 by the first polarizing plate 407 and reflected by the third surface 414 of the illumination prism 403. The reflected light is transmitted through the second surface 413 of the illumination prism 403 and incident on the LCD 402. Polarized light 420 incident on the LCD 402 is modulated by the LCD 402. As a consequence, the light modulated at 90° with respect to the first polarizing direction is transmitted through the second polarizing plate 409, whereas the light that is not modulated in the LCD 412 is absorbed by the second polarizing plate 409.

Figure 16A:
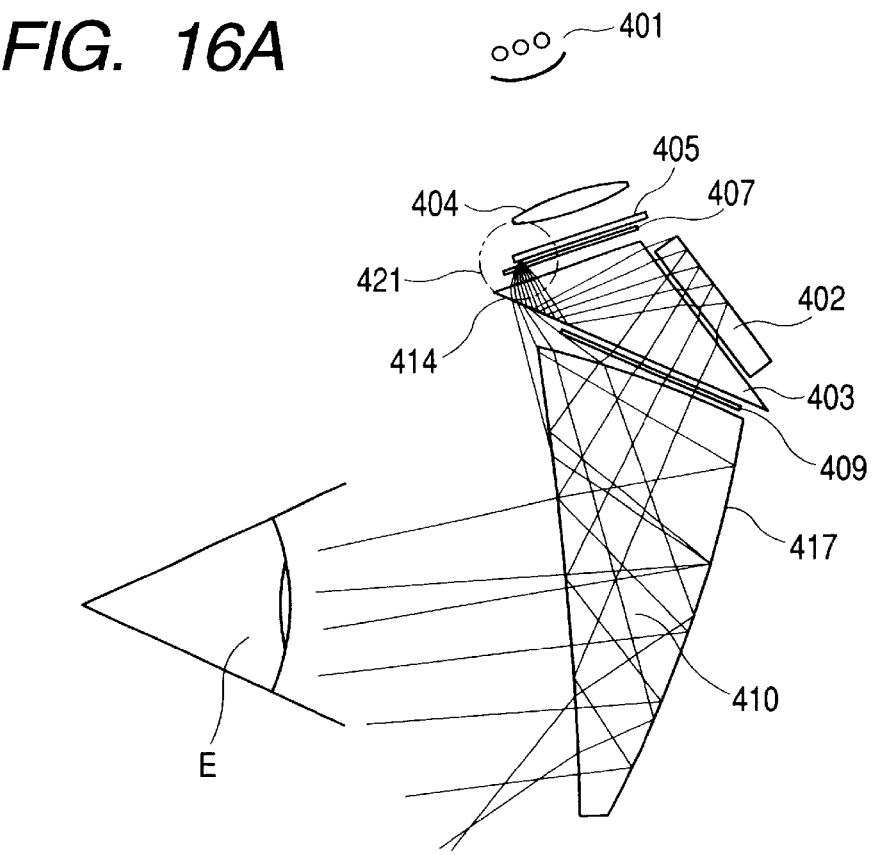
FIGS. 16A and 16B are views for explaining the effect of a light-shielding member in the tenth embodiment in FIG. 14.
Figure 16B:
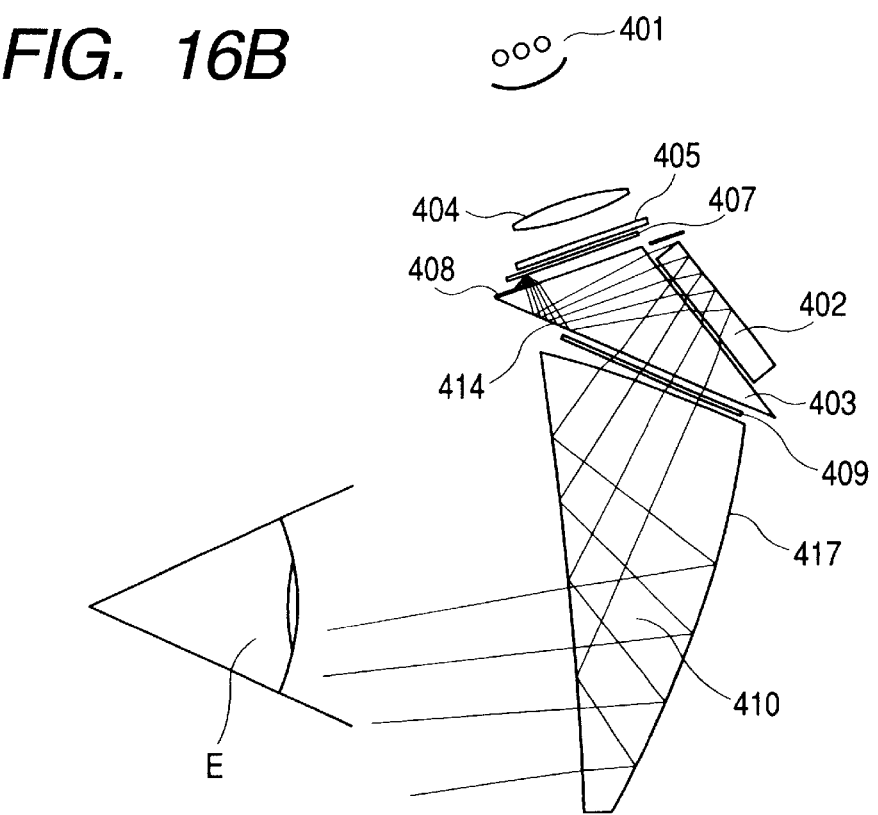

FIGS. 16A and 16B are views for explaining the effect of the light-shielding member 408. Without the light-shielding member 408, as shown in FIG. 16A, light 421, of the light emitted from the light source 401 and guided to the diffusion plate 405 by the lens 404, which is diffused by the exit surface of the first polarizing plate 407 located near the eye E of the observer, is partly reflected by the third surface 414 of the illumination prism 403, illuminates the LCD 402, and is reflected by the LCD 402. Thereafter, the light is guided as image light to the eye E of the observer. The remaining light beams are transmitted through the illumination prism 403 and strike the observation prism 410 without illuminating the LCD 402 and are reflected by the third surface 417 of the observation prism 410. The reflected light is partly incident on the eye E of the observer.

In contrast to this, in the tenth embodiment, as shown in FIG. 16B, light components guided to the eyes of the observer without illuminating the LCD 402 are removed by placing the light-shielding member 408 having an antireflection property between the light source 401 and the illumination prism 403.

By forming the light-shielding member 408 in this manner, unnecessary light can be effectively removed, thus increasing the contrast of an observation image and preventing flare and the like. In addition, this can prevent a deterioration in the quality of an observation image due to vignetting. Note that as the light-shielding member 408, a matte black film having an antireflection property may be formed by printing or coating or a light-shielding tape may be used.

(Eleventh Embodiment)

Figure 17:
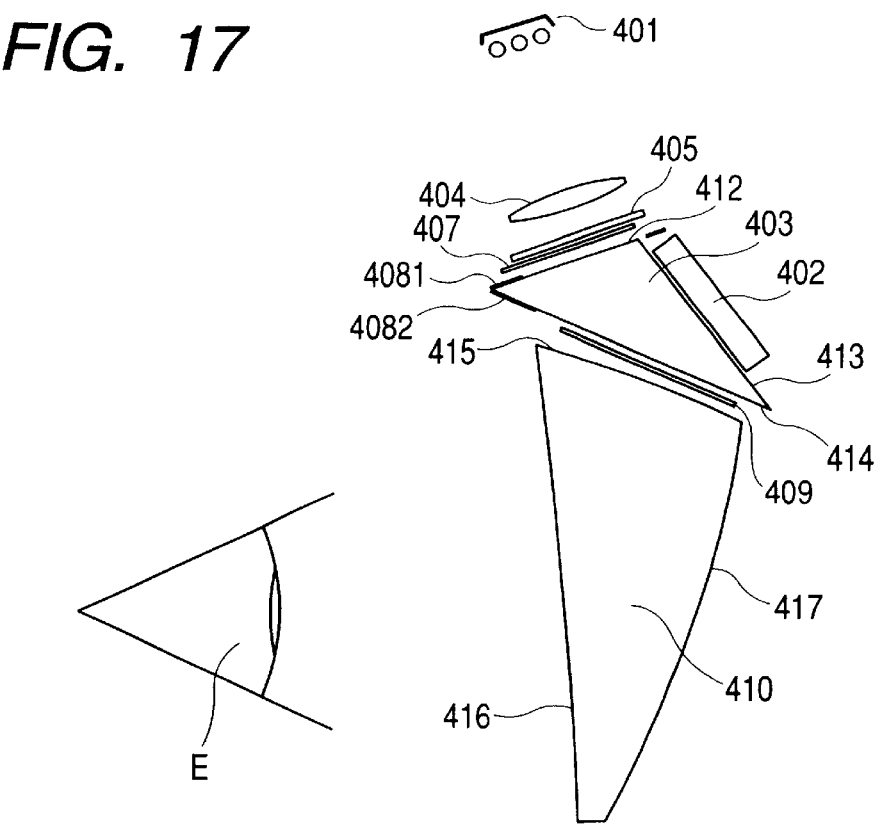
FIG. 17 is a sectional view showing the arrangement of a head-mounted display according to the eleventh embodiment of the present invention.

FIG. 17 shows a head-mounted display as an image display apparatus according to the eleventh embodiment of the present invention. The same reference numerals as in the tenth embodiment denote the same parts in FIG. 17. As shown in FIG. 17, a first light-shielding member 4081 is bonded on a first surface 412 of an illumination prism 403, and a second light-shielding member 4082 is bonded on a third surface 414 of the illumination prism 403.

The formation of the first and second light-shielding members 4081 and 4082 makes it possible to reliably remove unnecessary light, thus increasing the contrast of an observation image and preventing flare and the like. In addition, a deterioration in the quality of an observation image due to vignetting can be prevented.

(Twelfth Embodiment)

Figure 18:
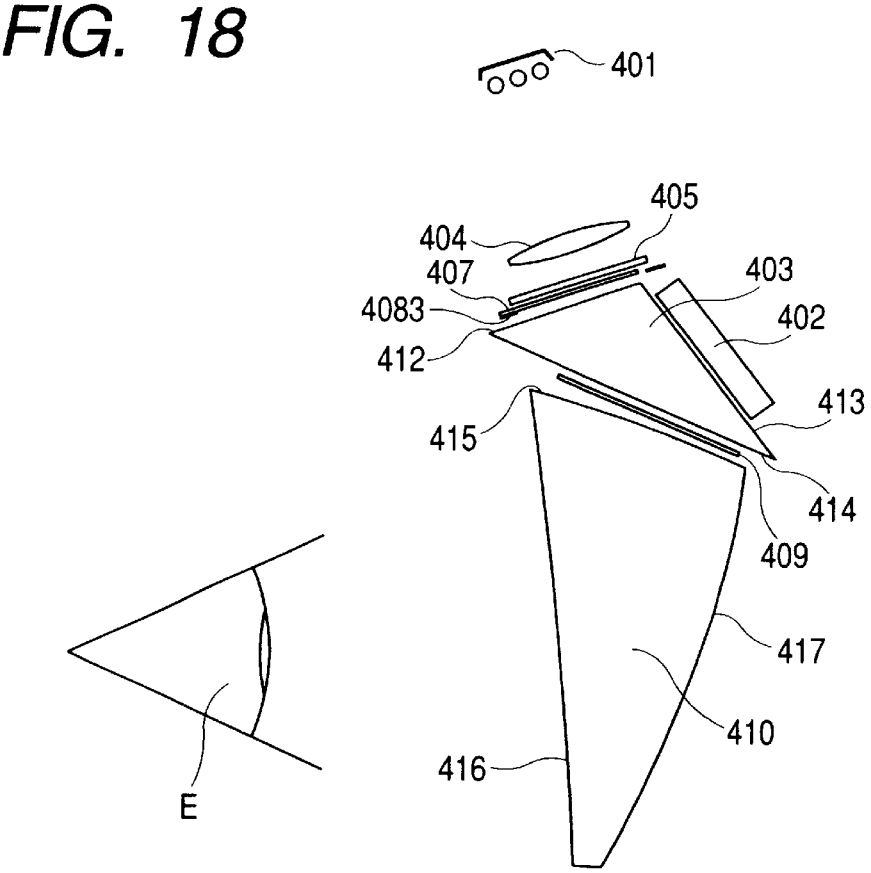
FIG. 18 is a sectional view showing the arrangement of a head-mounted display according to the twelfth embodiment of the present invention.

FIG. 18 shows a head-mounted display as an image display apparatus according to the twelfth embodiment of the present invention. The same reference numerals as in the tenth embodiment denote the same parts in FIG. 18. As shown in FIG. 18, a light-shielding member 4083 is bonded on a polarizing plate 407 between the polarizing plate 407 and a first surface 412 of an illumination prism 403.

This embodiment can also reliably remove unnecessary light and achieve an increase in the contrast of an observation image and prevention of flare and the like. In addition, a deterioration in the quality of an observation image due to vignetting can be prevented.

Note that a light-shielding member 408 may be placed between a diffusion plate 405 and the illumination prism 403 by using a holding member (not shown). Alternatively, the light-shielding member 408 may be directly formed on a holding member (not shown) for holding the illumination prism 403 or an observation prism 410.

The opening shape of a light-shielding member in this embodiment of the present invention will be described next with reference to FIGS. 19A and 19B.

Figure 19A:
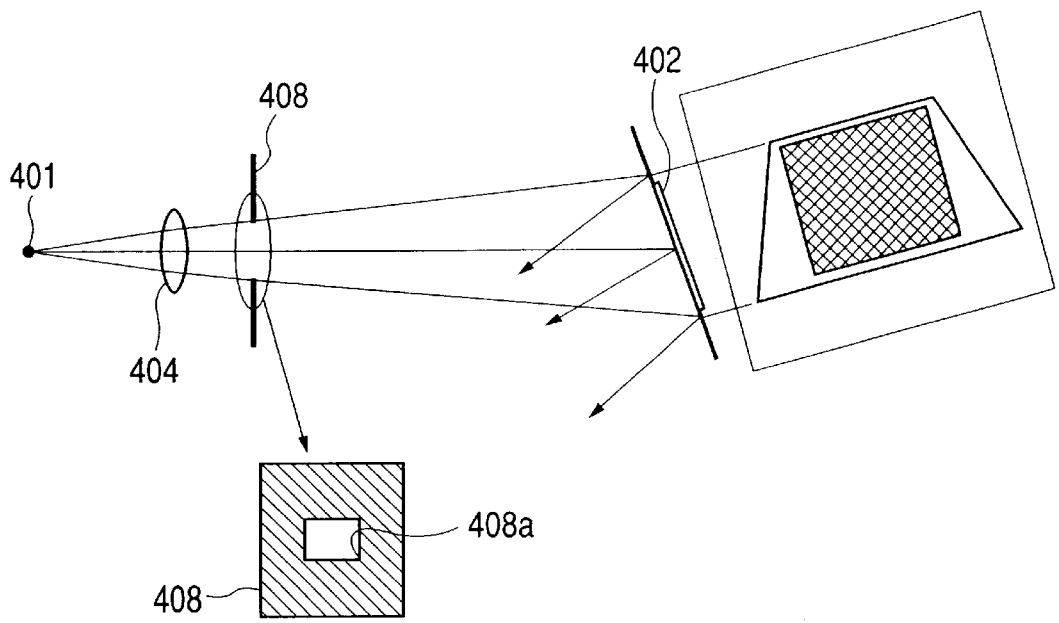
FIGS. 19A and 19B are views for explaining the shapes of the opening portions of light-shielding members in the embodiment of the present invention in FIG. 18.
Figure 19B:
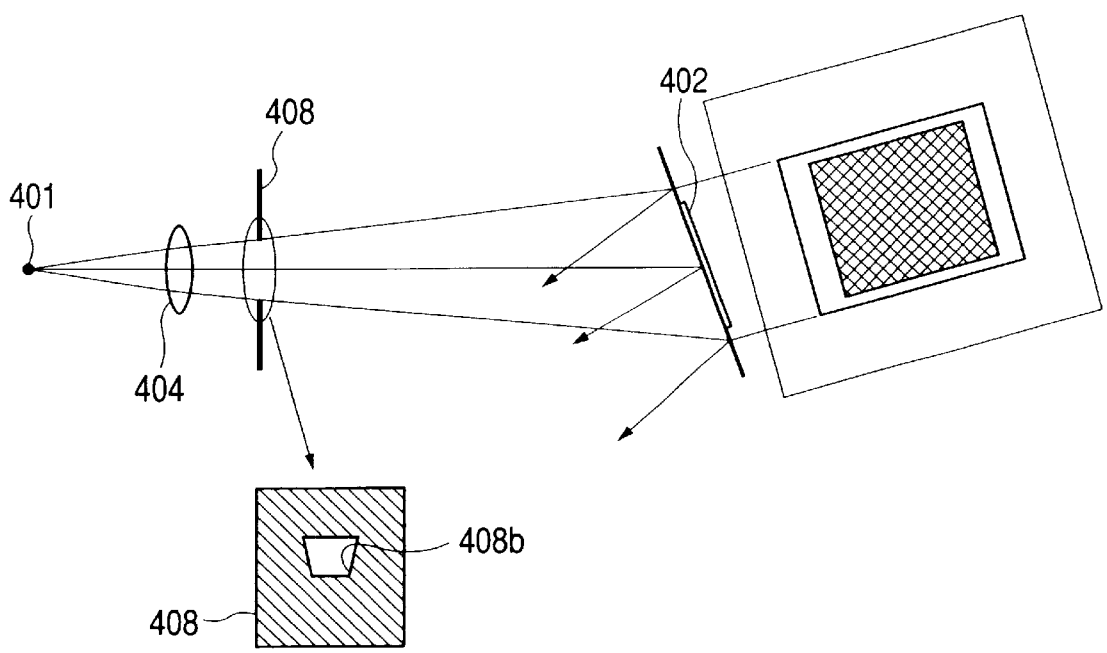
Figure 20:
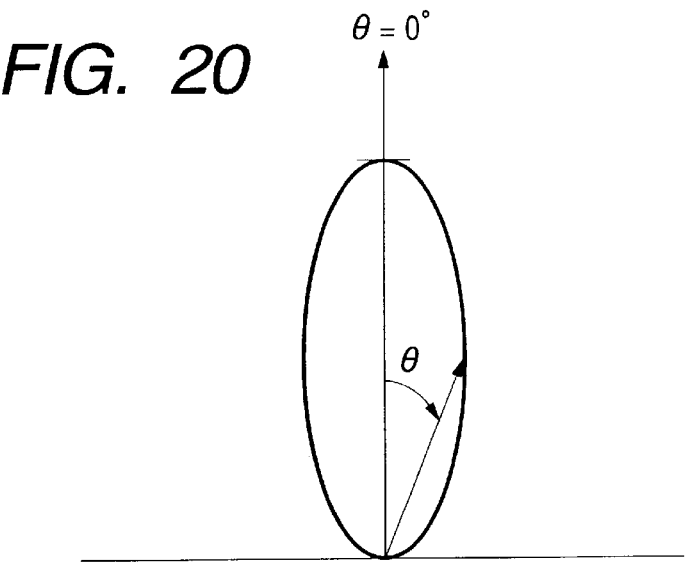
FIG. 20 is a view showing the intensity of a light beam in FIGS. 19A and 19B.

Each of FIGS. 19A and 19B is drawn by symmetrically developing the respective optical elements from the light source 401 to the LCD 402 in FIG. 14 from their original positions with respect to the third surface 414 which is the reflecting surface of the illumination prism 403 so as to clarify the positional relationship between the optical elements. Referring to FIGS. 19A and 19B, although an illustration of a diffusion plate and polarizing plate is omitted, since a light beam that is incident perpendicularly on the diffusion plate has a maximum intensity as shown in FIG. 20, the following description will be made with consideration given to only light components emerging in the same direction as the incident direction of an incident light beam.

The light emitted from a light source 401 is reflected by a third surface 414 of the illumination prism 403 and obliquely incident on an LCD 402. For this reason, a light beam from the light source 401 to the LCD 402 travels different distances depending on whether it travels to the upper or lower side of the effective image display area of the LCD 402 in the short side direction. As shown in FIG. 19A, if an opening 408a of the light-shielding member 408 has a rectangular shape, since the distance from the light source 401 to the lower side of the LCD 402 is longer than the distance from the light source 401 to the upper side of the LCD 402, illumination light slightly spreads on the lower side.

As described above, if the opening 408a of the light-shielding member 408 in this embodiment of the present invention has a rectangular shape, the effective image display area of the LCD 402 can be illuminated, and unnecessary light outside the effective image display area can be eliminated.

FIG. 19B is a view for explaining another shape of the opening of the light-shielding member 408 in this embodiment of the present invention.

As shown in FIG. 19B, an opening 408b of the light-shielding member 408 has a trapezoidal shape.

The opening 408b of the light-shielding member 408 is formed into a trapezoidal shape whose lower side is shorter than that of the opening 408a in FIG. 19A. The illumination light that has passed through the trapezoidal opening 408b of the light-shielding member 408 therefore illuminates an area, in the same plane as that of the LCD 402, which is similar in shape to the effective image display area of the LCD 402.

As described above, if the light-shielding member 408 in this embodiment of the present invention has the trapezoidal opening 408b, only the effective image display area of the LCD 402 can be illuminated and unnecessary light outside the effective image display area can be eliminated more reliably than in the case where the opening 408a of light-shielding member 408 shown in FIG. 19A is used.

A condition for illumination length in the short side direction of the effective image display area on the image display element (LCD) which is illuminated by using the opening of the light-shielding member in this embodiment of the present invention described with reference to each of FIGS. 19A and 19B will be described next with reference to FIG. 21.

Figure 21:
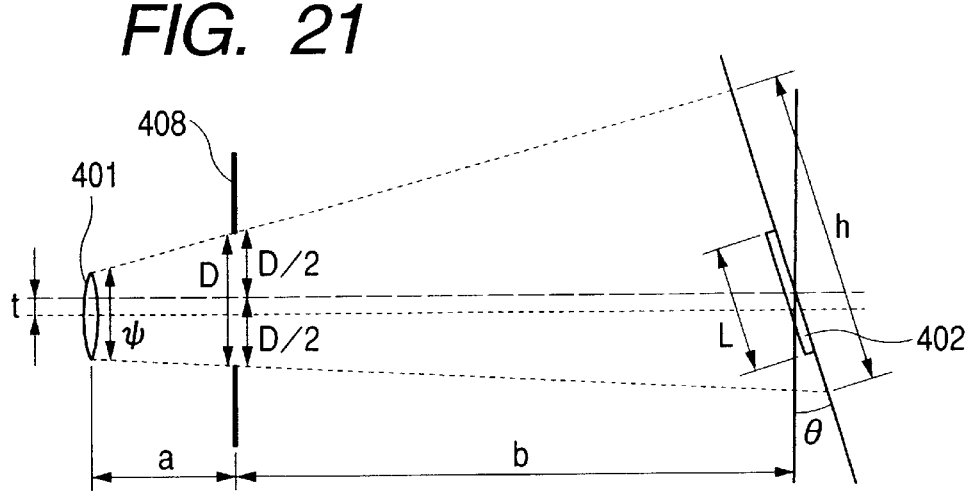
FIG. 21 is a view for explaining optical conditions associated with the position of light-shielding members and the sizes of openings in the embodiments of the present invention in FIGS. 14 to 19B.
Figure 22:
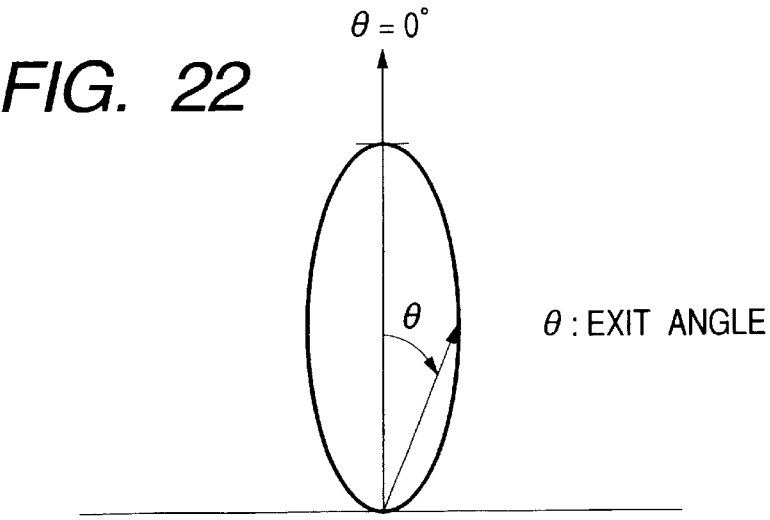
FIG. 22 is a view showing the intensity of a light beam in FIG. 21.

FIG. 21 is drawn by symmetrically developing the optical elements between the light source 401 and the LCD 402 in FIG. 14 from their original positions with respect to the third surface 414 as the reflecting surface of the illumination prism 403 to clarify the positional relationship between the respective optical elements. Referring to FIG. 21, although an illustration of a diffusion plate and polarizing plate is omitted, since a light beam that is incident perpendicularly on the diffusion plate has a maximum intensity as shown in FIG. 22, the following description will be made with consideration given to only light components emerging in the same direction as the incident direction of an incident light beam.

As shown in FIG. 21 (FIG. 14 as well), letting L be the length of the effective image display area of the LCD 402 in the short side direction, T be the effective diameter of the emission area of the light source 401, D be the width of the opening of the light-shielding member 408 in the direction corresponding to the short side direction of the effective image display area of the LCD 402, φ be the tilt angle of the LCD 402 with respect to a plane perpendicular to an optical axis defined by ray of light which illuminates the center of the LCD 402, a be the distance from the light source 401 to the light-shielding member 408, b1 be the length of an optical path from the first surface 412 to the third surface 414 in the illumination prism 403 along the optical axis defined by ray of light which illuminates the center of the LCD 402, b2 be the length of an optical path from the third surface 414 to the second surface 413 in the illumination prism 403 along the optical axis defined by ray of light which illuminates the center of the LCD 402, n be the refractive index of the illumination prism 403, and b be the air distance (equivalent optical path length in air) from the light-shielding member 408 to the LCD 402, with b=(b1+b2)/n, then an illumination length h in the short side direction of the effective image display area on the surface of the LCD 402 which is illuminated with light beams ranging from a light beam emitted from the upper end of the light source 401 and guided to the upper side of the LCD 402 to a light beam emitted from the lower end of the light source 401 and guided to the lower side of the LCD 402 is given by $$h = \{(D-\phi) \cdot b/2a + \phi/2\} \cdot \cos\theta \tag{2}$$

The image display area of the LCD 402 is effectively illuminated with the light emitted from the light source 401 by satisfying the condition that the illumination area represented by h includes 70% or more of the image display area of the LCD 402, and is three times or less larger than the image display area of the LCD 402:

$$0.7L/2 \leq h \leq 3L/2 \tag{3}$$

In a range below the lower limit of inequality (3), the light that is emitted from the light source 401 and illuminates the peripheral portion of the LCD 402 is partly blocked by the light-shielding member 408 before it illuminates the peripheral portion. As a consequence, the peripheral portion of the image becomes dark. In a range exceeding the upper limit inequality (3), unnecessary illumination light that does not illuminate the LCD 402 increases in intensity to cause flare.

In addition, as shown in FIG. 21 (FIG. 14 as well), letting L be the length of the effective image display area of the LCD 402 in the short side direction, T be the effective diameter of the emission area of the light source 401, D be the width of the opening of the light-shielding member 408 in the direction corresponding to the short side direction of the effective image display area of the LCD 402, θ be the tilt angle of the LCD 402 with respect to a plane perpendicular to an optical axis defined by ray of light which illuminates the center of the LCD 402, a be the distance from the light source 401 to the light-shielding member 408, b1 be the length of an optical path from the first surface 412 to the third surface 414 in the illumination prism 403 along the optical axis defined by ray of light which illuminates the center of the LCD 402, b2 be the length of an optical path from the third surface 414 to the second surface 413 in the illumination prism 403 on the optical axis defined by ray of light which illuminates the center of the LCD 402, n be the refractive index of the illumination prism 403, b be the air distance (equivalent optical path length in air) from the light-shielding member 408 to the LCD 402, with b=(b1+b2)/n, and t be the amount of parallel translation of the light source 401 from the optical axis defined by ray of light which is emitted from the light source 401, transmitted through the center of the opening of the light-shielding member 408, and illuminates the center of the LCD 402, then an illumination length h in the short side direction of the effective image display area on the surface of the LCD 402 which is illuminated with light beams ranging from a light beam emitted from the upper end of the light source 401 and guided to the upper side of the LCD 402 to a light beam emitted from the lower end of the light source 401 and guided to the lower side of the LCD 402 is given by $$h = \{(D-\phi) \cdot b/2a + \phi/2 + (b/a-1) \cdot |t|\} \cdot \cos\theta \tag{4}$$

The image display area of the+LCD 402 is effectively illuminated with the light emitted from the light source 401 by satisfying the condition that the illumination area represented by h includes 70% or more of the image display area of the LCD 402, and is three times or less larger than the image display area of the LCD 402:

$$0.7L/2 \leq h \leq 3L/2 \tag{5}$$

In a range below the lower limit of inequality (5), the light that is emitted from the light source 401 and illuminates the peripheral portion of the LCD 402 is partly blocked by the light-shielding member 408 before it illuminates the peripheral portion. As a consequence, the peripheral portion of the image becomes dark. In an range exceeding the upper limit inequality (5), unnecessary illumination light that does not illuminate the LCD 402 increases in intensity to cause flare.

A condition for the length of a side, of the opening of the light-shielding member 408 in this embodiment of the present invention, which corresponds to the short side direction of the effective image display area of the LCD 402 will be described next with reference to FIGS. 21 and 14.

Referring to FIG. 21 (FIG. 14 as well), letting L be the length of the effective image display area of the LCD 402 in the short side direction, φ be the effective diameter of the emission area of the light source 401, D be the width of the opening of the light-shielding member 408 in the direction corresponding to the short side direction of the effective image display area of the LCD 402, θ be the tilt angle of the LCD 402 with respect to a plane perpendicular to an optical axis defined by ray of light which illuminates the center of the LCD 402, a be the distance from the light source 401 to the light-shielding member 408, b1 be the length of an optical path from the first surface 412 to the third surface 414 in the illumination prism 403 on the optical axis defined by ray of light which illuminates the center of the LCD 402, b2 be the length of an optical path from the third surface 414 to the second surface 413 in the illumination prism 403 on the optical axis defined by ray of light which illuminates the center of the LCD 402, n be the refractive index of the illumination prism 403, b be the air distance (equivalent optical path length in air) from the light-shielding member 408 to the LCD 402, with b=(b1+b2)/n, and t be the amount of parallel translation of the light source 401 from the optical axis defined by ray of light which is emitted from the light source 401, transmitted through the center of the opening of the light-shielding member 408, and illuminates the center of the LCD 402, then an illumination length h in the short side direction of the effective image display area on the surface of the LCD 402 which is illuminated with light beams ranging from a light beam emitted from the upper end of the light source 401 and guided to the upper side of the LCD 402 to a light beam emitted from the lower end of the light source 401 and guided to the lower side of the LCD 402 is given by $$h = \{(D-\phi) \cdot b/2a + \phi/2 + (b/a-1) \cdot |t|\} \cdot \cos\theta \quad (4)$$

When the illumination area represented by h satisfies the condition that the illumination area represented by h includes 70% or more of the image display area of the LCD 402, and is three times or less larger than the image display area of the LCD 402:

$$0.7L/2 \leq h \leq 3L/2 \quad (5)$$

the length D of the side of the opening of the light-shielding member 408 which corresponds to the short side direction of the effective image display area of the LCD 402 is expressed by modifying equation (4) as follows:

$$\left\{\frac{0.7L}{2\cos\theta} - \frac{\varphi}{2} - \left(\frac{b}{a}-1\right) \cdot |t|\right\} \cdot \frac{2a}{b} + \varphi \leq \quad (6)$$

$$D \leq \left\{\frac{3L}{2\cos\theta} - \frac{\varphi}{2} - \left(\frac{b}{a}-1\right) \cdot |t|\right\} \cdot \frac{2a}{b} + \varphi$$

In this case, if the respective variables are $$2.0 \leq \phi \leq 5.0 \text{ (mm)}$$

$$0.3 \leq \frac{b}{a} \leq 0.7$$

$$5.0 \leq L \leq 10.0 \text{ (mm)}$$

$$|t| \leq 5.0 \text{ (mm)}$$

$$0° \leq \theta \leq 30° \sqrt{3/2} \leq \cos\theta \leq 1.0$$

then, D satisfies $$1.0 \leq D \leq 22.9 \text{ (mm)} \quad (7)$$

By satisfying inequality (7), the effective image display area of the LCD 402 is efficiently illuminated with the light emitted from the light source 401.

In a range below the lower limit of inequality (7), the light that is emitted from the light source 401 and illuminates the peripheral portion of the LCD 402 is partly blocked by the light-shielding member 408 before it illuminates the peripheral portion. As a consequence, the peripheral portion of the image becomes dark. In a range exceeding the upper limit inequality (7), unnecessary illumination light that does not illuminate the LCD 402 increases in intensity to cause flare.

Numerical embodiments of the observation prism in this embodiment of the present invention will be described next.

Figure 23:
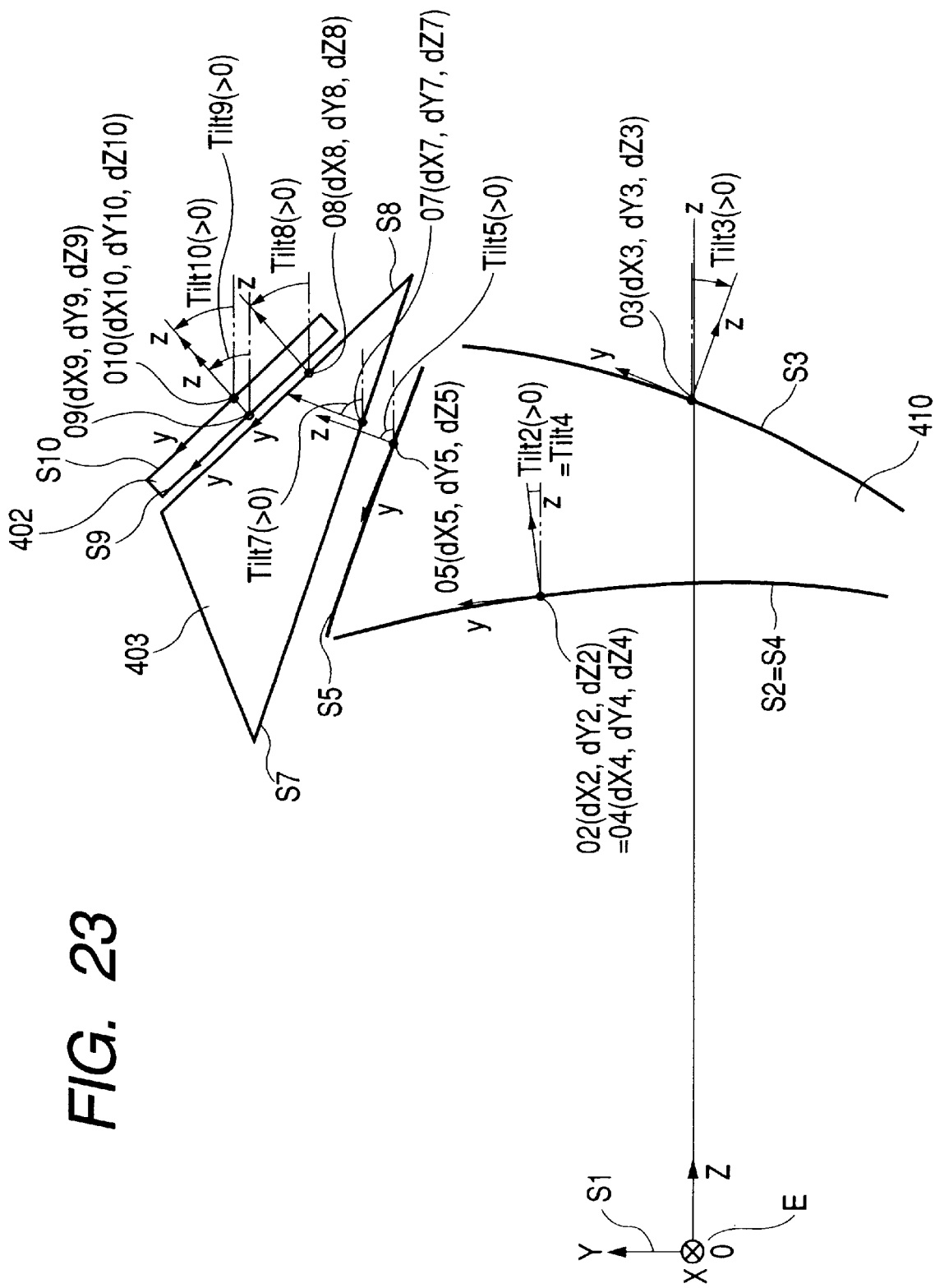
FIG. 23 is a view showing an absolute coordinate system and local coordinate systems to explain an observation prism in the embodiments of the present invention.

Since the observation prism in the above embodiment is formed by decentered (tilted) surfaces, an absolute coordinate system and local coordinate systems are set to express the shape of each decentered surface. FIG. 23 is a view for explaining the absolute coordinate system and local coordinate systems.

The origin of the absolute coordinate system is set at a center O of the desired pupil of the observer, and the Z-axis is a straight line that passes through the point O, is perpendicular to a pupil plane, and located on the pupil plane. The Y-axis is a straight line that passes through the origin O and defines 90° counterclockwise with respect to the Z-axis on the pupil plane. The X-axis is a straight line that passes through the origin O and is perpendicular to the Y- and Z-axes.

An origin Oi of a local coordinate system is expressed by absolute coordinates (dXi, dYi, dZi) and set for each surface i. The z-axis of a local coordinate system is a straight line that passes through the origin Oi within the Y-Z plane and defines an angle Tilti together with the Z-axis of the absolute coordinate system. Assume that the angle Tilti is positive when the Z-axis of a local coordinate system passes the origin Oi and defines a counterclockwise angle with respect to a straight line parallel to the Z-axis of the absolute coordinate system. The Y-axis of a local coordinate system is a straight line that passes through the origin Oi and defining an angle of 90° counterclockwise with respect to the z-axis of the local coordinate system. The X-axis of the local coordinate system is a straight line passing through the origin Oi and crossing the Y- and Z-axes of the local coordinate system at right angles.

The shape of each surface is expressed by local coordinates. The respective decentered surfaces have shapes with aspherical surfaces expressed by Zernike polynomials with shape functions representing quadratic surfaces, which are expressed by the following functions.

$$z = \frac{c(x^2+y^2)}{1+\{1-c^2(x^2+y^2)\}^{1/2}} + c4(x^2-y^2) +$$

$$c5(-1+2x^2+2y^2) + c9(-2y+3x^2y+3y^3) + c10(3x^2y-y^3) +$$

$$c11(x^4-6x^2y^2+y^4) + c12(-3x^2+4x^4+3y^2-4y^4) +$$

$$c13(1-6x^2+6x^4-6y^2+12x^2y^2+6y^4) +$$

$$c19(3y-12x^2y+10x^4y-12y^3+20x^2y^3+10y^5) +$$

$$c20(-12x^2y+15x^4y+4y^3+10x^2y^3-5y^5) +$$

$$c21(5x^4y-10x^2y^3+y^5) + c22(x^6-15x^4y^2+15x^2y^4-y^6) +$$

$$c23(6x^6-30x^4y^2-30x^2y^4+6y^6-5x^4+30x^2y^2-5y^4) +$$

$$c24(15x^6+15x^4y^2-15x^2y^4-15y^6-20x^4+20y^4+6x^2-6y^2) +$$

$$c25(20x^6+60x^4y^2+60x^2y^4+20y^6-$$

$$30x^4-60x^2y^2-30y^4+12x^2+12y^2-1)$$

where r is the basic radius of curvature of each surface, c is given by c=1/r, and ci is the aspherical coefficient of the ith Zernike polynomial for each surface.

Tables 1 and 2 show the first and second numerical embodiments of the observation prism in this embodiment of the present invention.

TABLE 1

(First Numerical Embodiment)

fx (focal length in X direction) = 19.118 mm
fy (focal length in Y direction) = 19.376 mm
wx (half field angle in X direction) = 14.6°
wy (half field angle in Y direction) = 11.1°
prism n (refractive index of observation prism) = 1.571
S1   r: ∞    d: 31.61   n: 1.0000
S2   dX2: 0  dY2: −61.22  dZ2: 31.61  Tilt2: −4.58
     r: −387.806
     c4: −4.885e−04    c5: −3.769e−04    c9: −4.612e−07
     c10: −1.599e−06   c11: 2.735e−08    c12: 1.302e−09
     c13: −2.524e−09   c19: −1.755e−11   c20: 2.857e−12
     c21: 3.613e−10    c22: −4.584e−12   c23: −1.324e−13
     c24: 9.690e−14    c25: −2.070e−13

TABLE 1-continued (First Numerical Embodiment)

| | | | | |
|---|---|---|---|---|
| S3 | dX3:0 dY3: −5.89 dZ3: 37.23 Tilt3: −23.86 | | | |
| | r: −62.575 | | | |
| | c4: −1.293e−03 | c5: −1.070e−03 | c9: −3.652e−06 | |
| | c10: −9.954e−06 | c11: 3.326e−07 | c12: −6.316e−07 | |
| | c13: 9.565e−08 | c19: −1.707e−08 | c20: 1.741e−08 | |
| | c21: −1.442e−08 | c22: −2.759e−10 | c23: 3.529e−10 | |
| | c24: −2.403e−11 | c25: 1.781e−10 | | |
| S4 | dX4: 0 dY4: −61.22 dZ4: 31.61 Tilt4: −4.58 | | | |
| | r: −387.806 | | | |
| | c4: −4.885e−04 | c5: −3.769e−04 | c9: −4.612e−07 | |
| | c10: −1.599e−06 | c11: 2.735e−08 | c12: 1.302e−09 | |
| | c13: −2.524e−09 | c19: −1.755e−11 | c20: 2.857e−12 | |
| | c21: 3.613e−10 | c22: −4.584e−12 | c23: 1.324e−13 | |
| | c24: 9.690e−14 | c25: −2.070e−13 | | |
| S5 | dX5: 0 dY5: 8.08 dZ5: 46.89 Tilt5: 44.96 | | | |
| | r: −185.986 | | | |
| | c4: 1.348e−02 | c5: −5.340e−03 | c9: −5.793e−05 | |
| | c10: −2.757e−04 | c11: −1.124e−05 | c12: −8.225e−06 | |
| | c13: 6.202e−07 | c19: −1.004e−07 | c20: −2.030e−07 | |
| | c21: −4.138e−07 | c22: 0.000e+00 | c23: 0.000e+00 | |
| | c24: 0.000e+00 | c25: 0.000e+00 | | |
| S6 | dX6: 0 dY6: 12.95 dZ6: 42.02 Tilt6: −62.17 | | | |
| S6 | r: ∞ d: 0.20 n: 1.0000 | | | |
| S7 | dX7: 0 dY7: 13.13 dZ7: 41.92 Tilt7: 66.50 | | | |
| S7 | r: ∞ d: 6.00 n: 1.6968 | | | |
| S8 | dX8: 0 dY8: 18.43 dZ8: 39.12 Tilt8: 37.65 | | | |
| S8 | r: ∞ d: 0.30 n: 1.0000 | | | |
| S9 | r: ∞ d: 1.76 n: 1.5230 | | | |
| S10 | r: ∞ d: 0.00 n: 1.0000 | | | |

In this case, as shown in FIG. 23, Si (i=1 to 10) represents three surfaces S2 (S4), S3, and S5 of the observation prism 410, two surfaces S7 and S8 of the illumination prism 403, a surface S9 of the LCD 402, and a reflected image plane S10 in the order in which a ray of light passes when reversely traced from an image plane S1 at the eye E of the observer. In the table, fx represents a value corresponding to the focal length of the observation prism, and is calculated from an incident angle θ of incident light from an object at infinity in a reverse trace from the eye of the observer, and an image height $x_m$ at which the light beam is formed into an image on the LCD according to $$f_x = x_m / \tan(\theta)$$

This value will be simply termed as a focal length. In addition, fy represents the focal length of the observation prism in the y direction, which is calculated in the same manner as the focal length in the x direction. However, since the focal length on the upper side of the LCD differs from that on the lower side, the value fy is the average of focal lengths obtained from an image height $y_m$ on the upper side of the LCD and an image height $-y_m'$ on the lower side of the LCD.

Numerical values for expression (1):

φ=4.00

D=8.97

Θ=12.26° a=14.27 b=7.87 t=0.32 h≡{(D−φ)·b/2a+φ/2+(b/a−1)·|t|}·cosΘ=3.15>2.51(=0.7L/2),<10.74(=3L/2)

L=7.16

TABLE 2

(Second Numerical Embodiment)

fx (focal length in X direction) = 17.78 mm
fy (focal length in Y direction) = 19.01 mm
wx (half field angle in X direction) = 15.0°
wy (half field angle in Y direction) = 11.2°
prism n (refractive index of observation prism) = 1.571

| | | | | |
|---|---|---|---|---|
| S1 | r: ∞ d: 24.44 n: 1.0000 | | | |
| S2 | dX2: 0 dY2: −66.11 dZ2: 24.44 Tilt2: −6.97 | | | |
| | r: −460.248 | | | |
| | c4: −9.304e−04 | c5: −3.211e−04 | c9: 3.394e−07 | |
| | c10: −7.294e−06 | c11: 8.999e−08 | c12: −3.540e−09 | |
| | c13: −1.663e−09 | c19: −4.677e−11 | c20: −4.003e−12 | |
| | c21: 7.951e−10 | c22: −2.935e−12 | c23: −1.193e−12 | |
| | c24: 7.284e−13 | c25: −6.250e−13 | | |
| S3 | dX3:0 dY3: −2.25 dZ3: 36.72 Tilt3: −29.69 | | | |
| | r: −51.494 | | | |
| | c4: −1.601e−03 | c5: −2.139e−03 | c9: −6.666e−06 | |
| | c10: −8.173e−06 | c11: 5.438e−08 | c12: −3.901e−07 | |
| | c13: −3.012e−07 | c19: −1.203e−08 | c20: 2.125e−09 | |
| | c21: −6.631e−09 | c22: −2.517e−10 | c23: 1.007e−10 | |
| | c24: −1.856e−10 | c25: −4.149e−11 | | |
| S4 | dX4: 0 dY4: −66.11 dZ4: 24.44 Tilt4: −6.97 | | | |
| | r: −460.248 | | | |
| | c4: −9.304e−04 | c5: −3.211e−04 | c9: 3.394e−07 | |
| | c10: −7.294e−06 | c11: 8.999e−08 | c12: −3.540e−09 | |
| | c13: −1.663e−09 | c19: −4.677e−11 | c20: −4.003e−12 | |
| | c21: 7.951e−10 | c22: −2.935e−12 | c23: −1.193e−12 | |
| | c24: 7.284e−13 | c25: −6.250e−13 | | |
| S5 | dX5: 0 dY5: 10.37 dZ5: 42.98 Tilt5: 40.94 | | | |
| | r: −212.022 | | | |
| | c4: 1.936e−02 | c5: −4.534e−03 | c9: −6.159e−04 | |
| | c10: −7.698e−04 | c11: −5.875e−05 | c12: −5.283e−06 | |
| | c13: 2.545e−05 | c19: −2.037e−07 | c20: 2.618e−07 | |
| | c21: 1.569e−06 | c22: 0.000e+00 | c23: 0.000e+00 | |
| | c24: 0.000e+00 | c25: 0.000e+00 | | |
| S6 | dX6: 0 dY6: 16.94 dZ6: 37.28 Tilt6: 48.13 | | | |
| S6 | r: ∞ d: −1.78 n: 1.0000 | | | |
| S7 | dX7: 0 dY7: 15.61 dZ7: 36.09 Tilt7: 64.39 | | | |
| S7 | r: ∞ d: 3.34 n: 1.5163 | | | |
| S8 | dX8: 0 dY8: 18.10 dZ8: 38.32 Tilt8: 34.39 | | | |
| S8 | r: ∞ d: 0.10 n: 1.0000 | | | |
| S9 | r: ∞ d: 1.10 n: 1.5230 | | | |
| S10 | r: ∞ d: 0.00 n: 1.0000 | | | |

In this case, Si, fx, and fy represent the same values as in Table 1 described above.

Numerical values for expression (1):

φ=4.00

D=8.97

Θ=18.89° a=13.75 b=9.32 t=0.00 h≡{(D−φ)·b/2a+φ/2+(b/a−1)·|t|}·cosΘ=3.49>2.51(=0.7L/2),<10.74(=3L/2)

L=7.16

Figure 24:
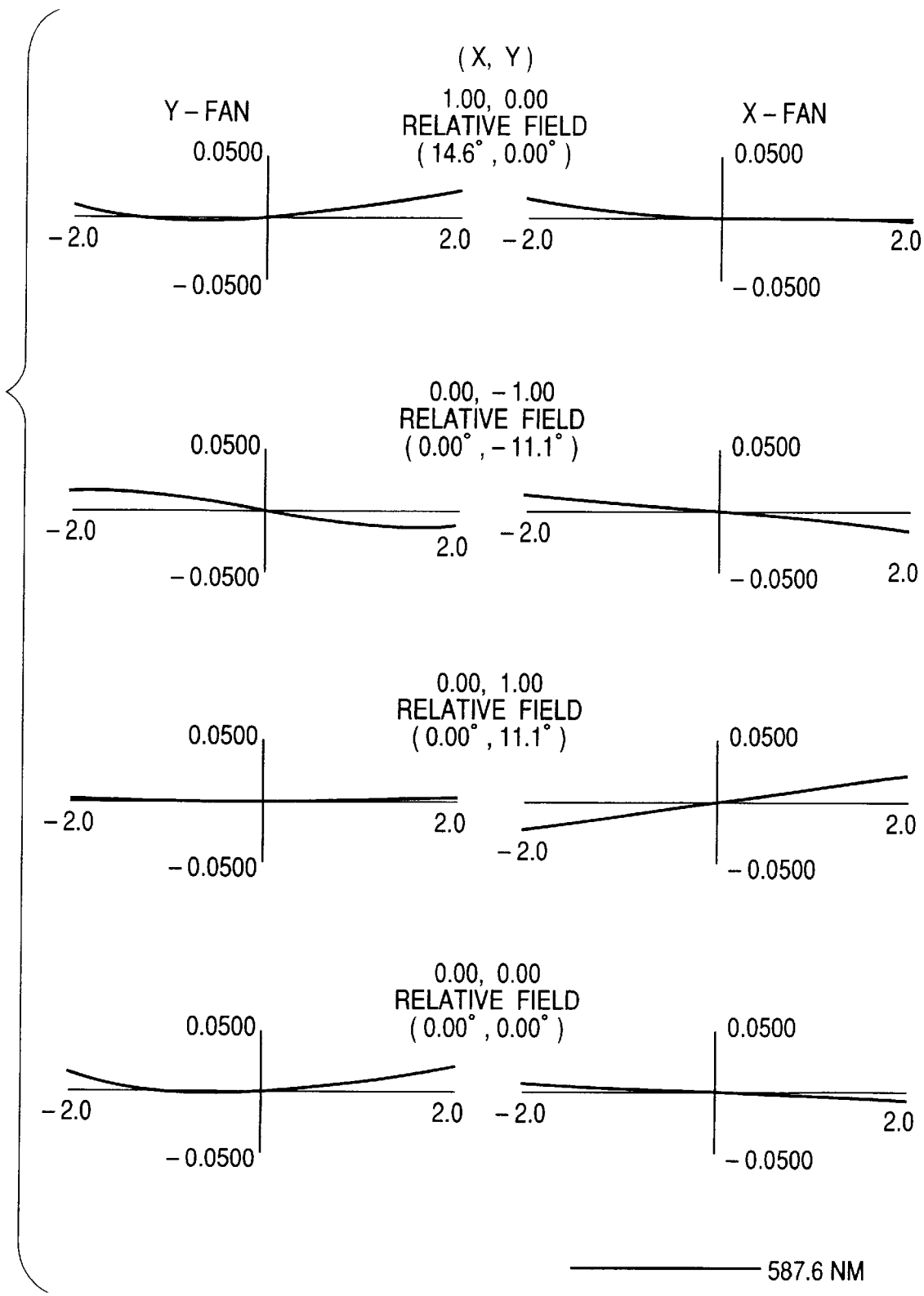
FIG. 24 is a transverse aberration chart on an LCD when reversely traced from an eye of an observer according to the first numerical embodiment of the observation prism in the embodiment of the present invention.
Figure 25:
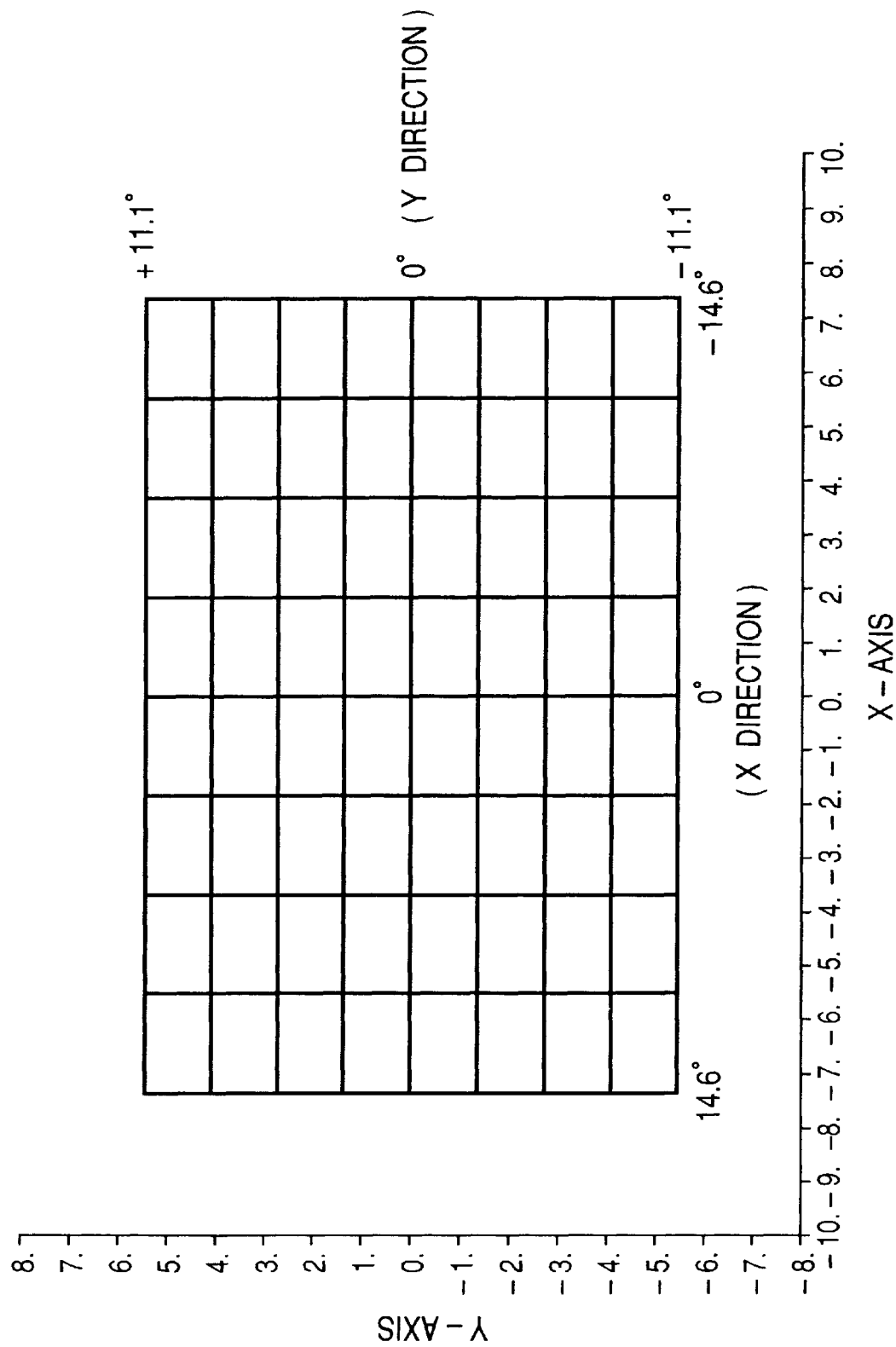
FIG. 25 is an image distortion chart on an LCD when reversely traced from an eye of an observer according to the first numerical embodiment of the observation prism in the embodiment of the present invention.

FIGS. 24 and 25 are transverse aberration and distortion charts according to the first numerical embodiment in the embodiment of the present invention which is represented by Table 1. The transverse aberration chart shows aberrations in the x and y directions.

Figure 26:
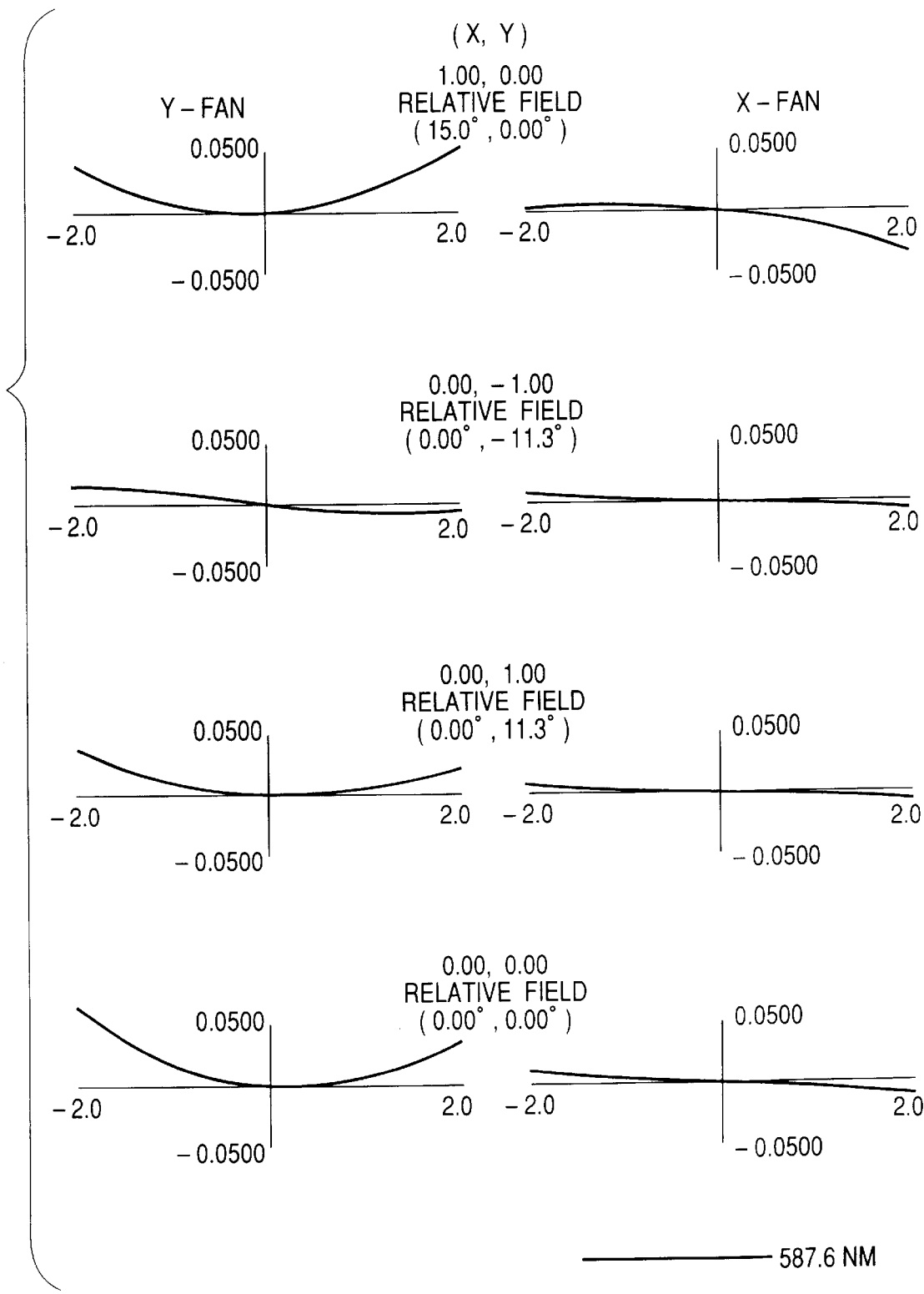
FIG. 26 is a transverse aberration chart on an LCD when reversely traced from an eye of an observer according to the second numerical embodiment of the observation prism in the embodiment of the present invention.
Figure 27:
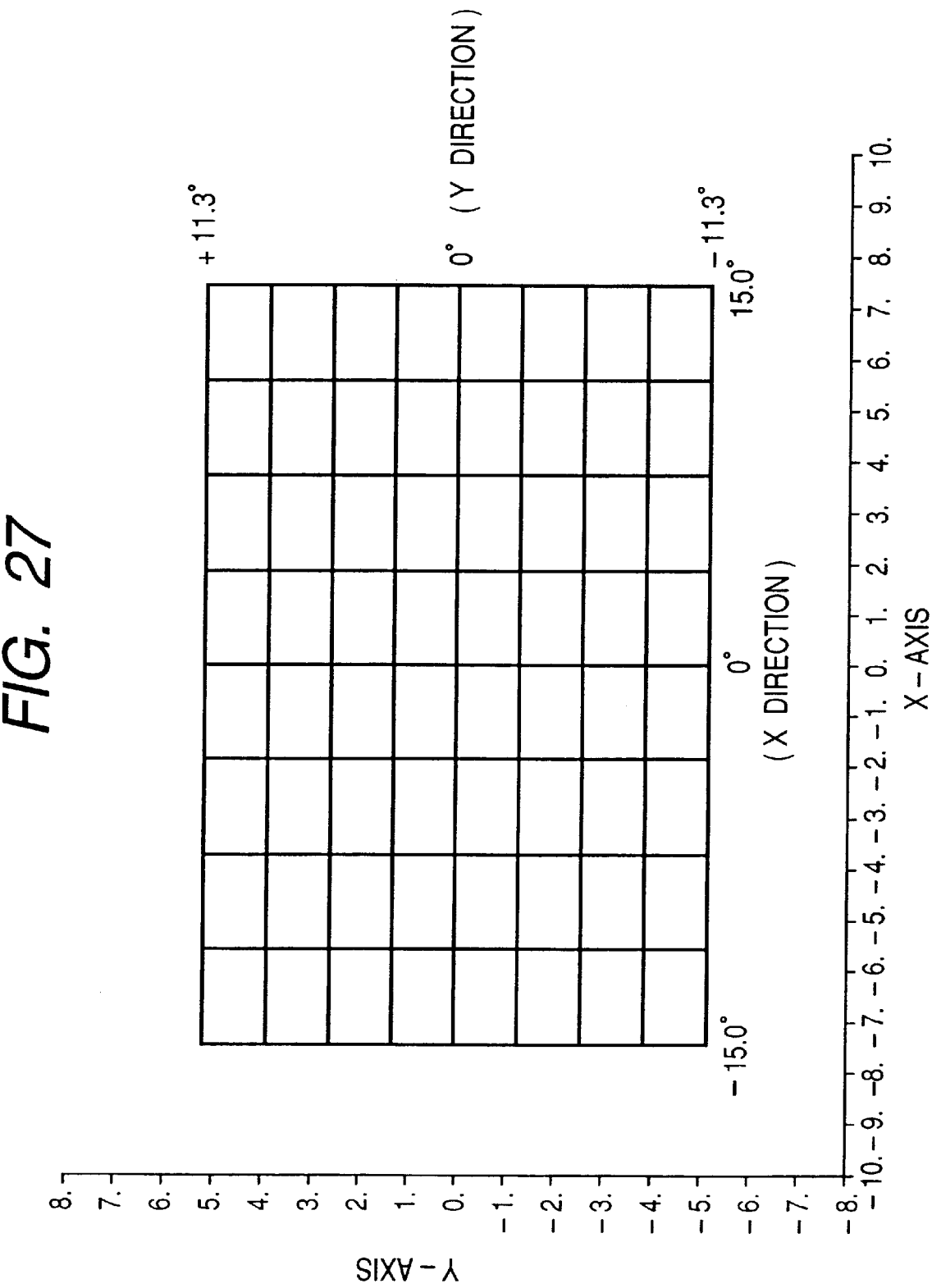
FIG. 27 is an image distortion chart on an LCD when reversely traced from an eye of an observer according to the second numerical embodiment of the observation prism in the embodiment of the present invention.

FIGS. 26 and 27 are transverse aberration and distortion charts according to the second numerical embodiment in the embodiment of the present invention which is represented by Table 2. The transverse aberration chart shows aberrations in the x and y directions.

A head-mounted display and image supply apparatus which constitute an image display system according to an embodiment of the present invention will be described next with reference to FIG. 28.

Figure 28:
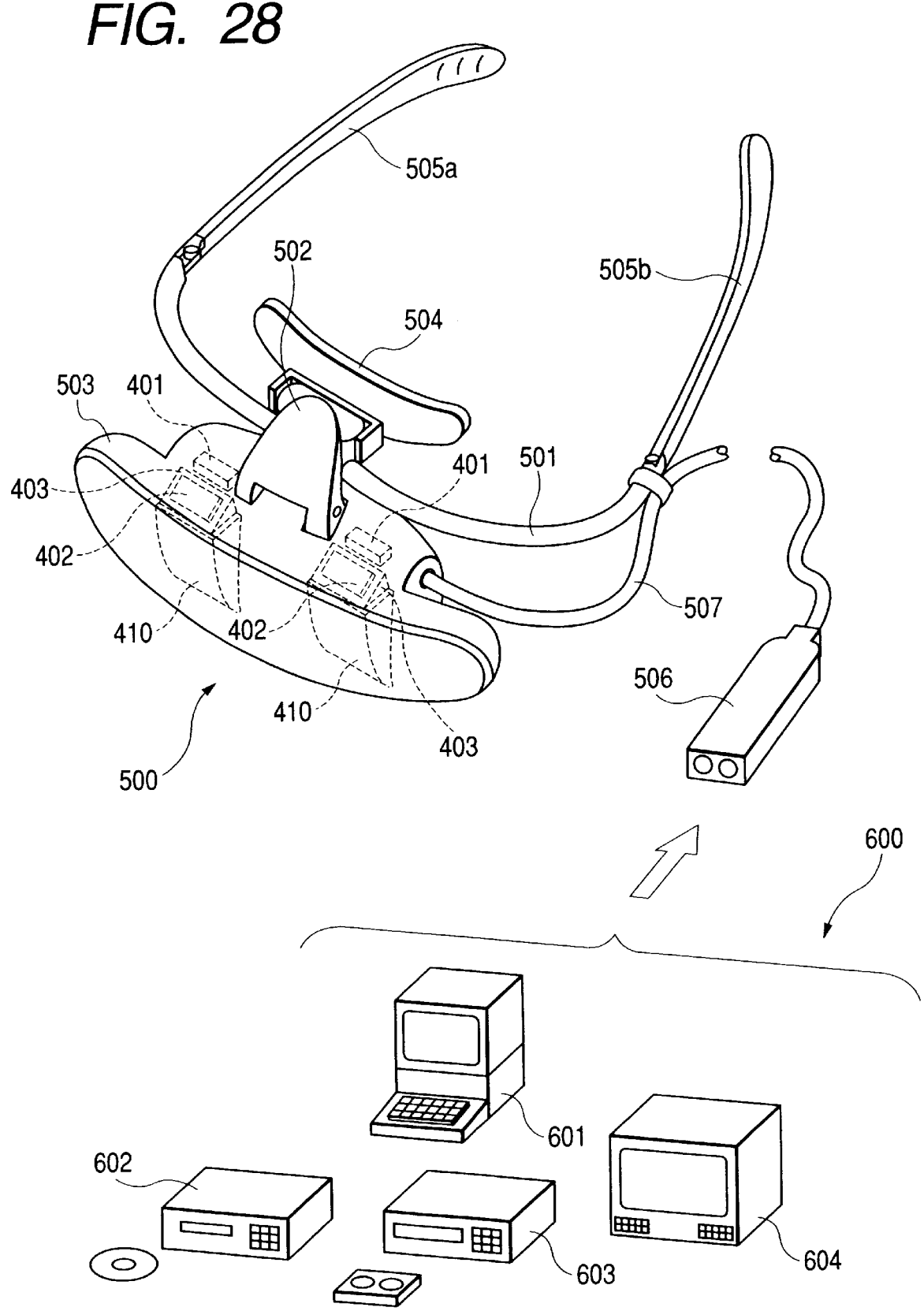
FIG. 28 is a view for explaining an image display system according to an embodiment of the present invention.
Figure 29:
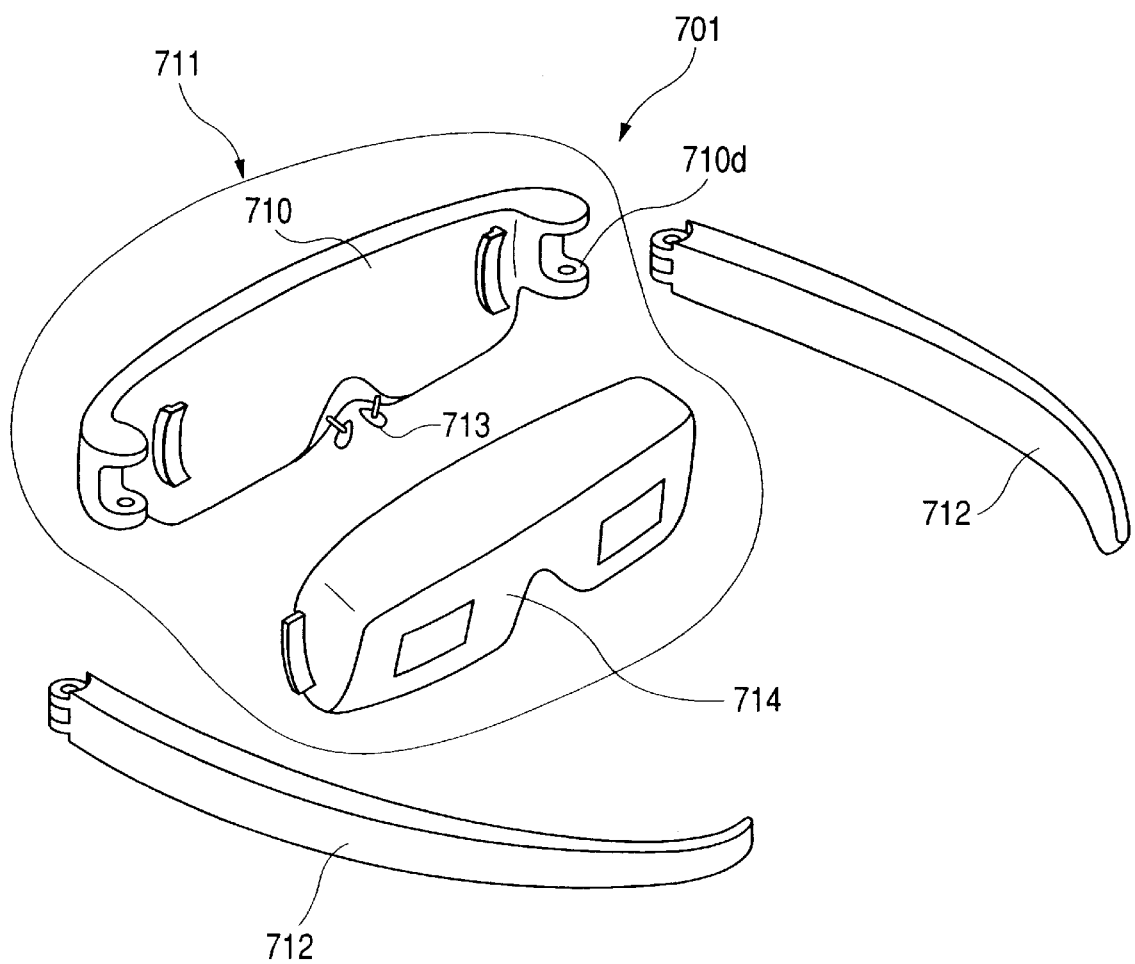
FIG. 29 is an exploded perspective view of a conventional head-mounted display.
Figure 30:
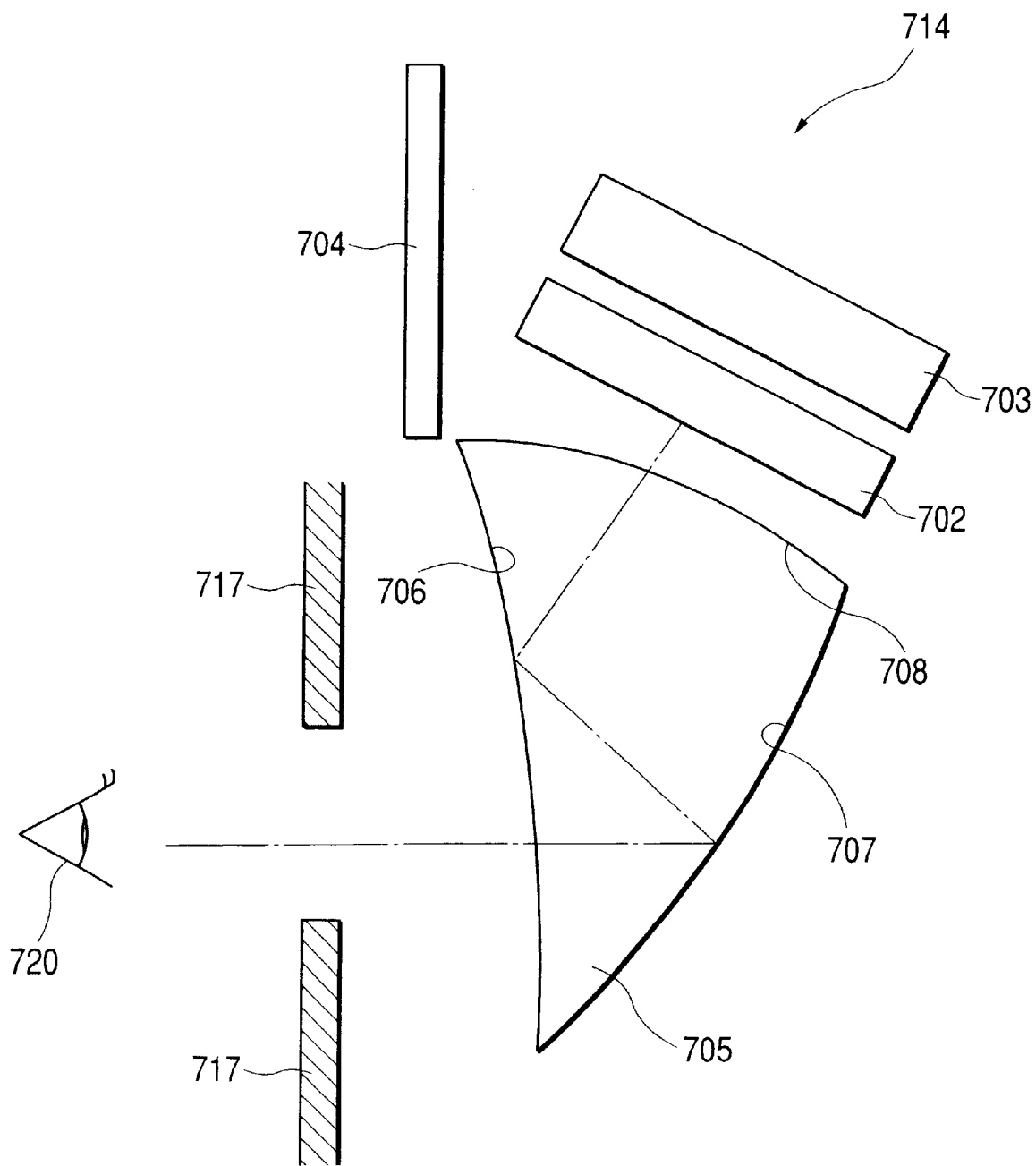
FIG. 30 is a sectional view showing the optical arrangement of the conventional head-mounted display.
Figure 31:
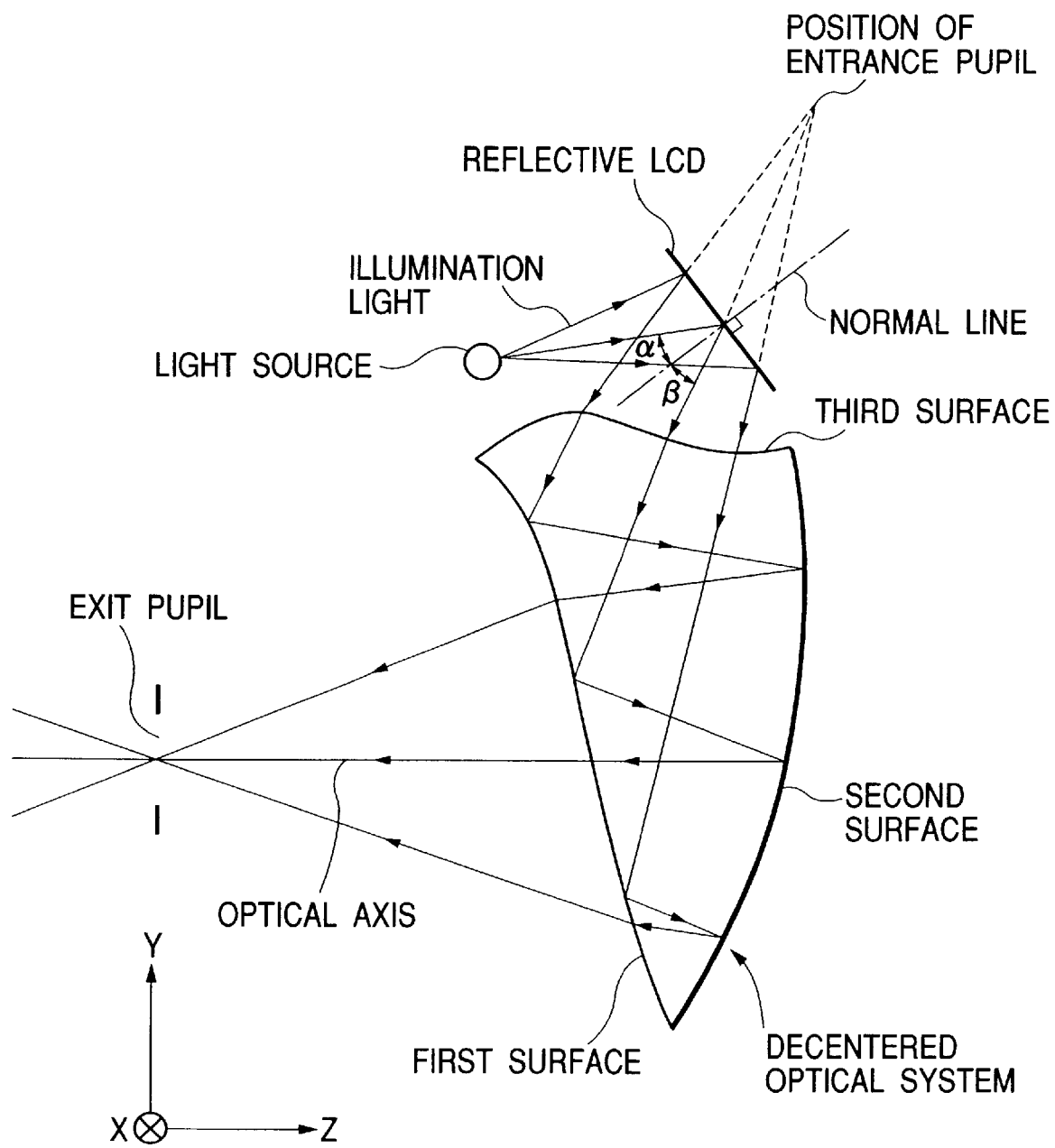
FIG. 31 is a sectional view showing the optical arrangement of another conventional head-mounted display.

FIG. 28 shows a head-mounted display (to be referred to as an HMD hereinafter) 500. A display body 503 is supported on a main frame 501 of the HMD 500 through a support member 502. The reflective LCD 402, illumination prism 403, light source 401, observation prism 410, and light-shielding member, which have been described above in the above embodiment, are housed in the display body 503. Although not shown, electric parts such as various types of circuit boards are also housed in the display body 503.

A pad 504 that comes into contact with the forehead of the observer when he/she wears the HMD is mounted on the main frame 501. Side surface frames 505a and 505b are attached to the two sides of the main frame 501 so as to produce biasing forces inward. The HMD 500 is mounted on the head portion of the observer with the biasing forces produced by the pad 504 and the side surface frames 505a and 505b. A relay cord 507 is connected to the display body 503 to supply signals such as image signals and power from a relay box 506.

Referring to FIG. 28, an image supply apparatus 600 serves to output image signals from, for example, a computer 601, a disk player 602 such as a DVD player, a video cassette player 603, and a TV receiver 604. A signal output from each apparatus is connected to the relay box 506 and supplied to each circuit board (not shown) in the HMD 500 through the relay box 506 and relay cord 507. The supplied image is then displayed on the LCD 402. The displayed image light is supplied from the observation prism 410 to the observer. In this case, according to the present invention, since unnecessary light of illumination light and image light is effectively eliminated by the light-shielding member, the observer can observe excellent images.

As has been described above, according to the present invention, unnecessary light in image display can be effectively eliminated. This makes it possible to improve uniformity of illumination on the image display element and effectively prevent a decrease in the contrast of images and occurrence of flare and ghosts, thus allowing the observer to observe excellent images. Therefore, the observer can observe excellent images regardless of the positional relationship between the image display apparatus and the eyes of the observer.

What is claimed is:

1. An image display apparatus comprising:
   a light source for emitting illumination light;
   an image display element for displaying an image by reflecting the illumination light incident thereon;
   an illumination optical element which reflects the illumination light from said light source toward said image display element and through which image light from said image display element is transmitted;
   an observation optical element for guiding the image light transmitted through said illumination optical element to an eye of an observer; and
   a light-shielding member for blocking at least one of unnecessary light which is contained in illumination light from said light source and travels outside an effective image display area of said image display element and unnecessary light which is contained in image light from said image display element and travels outside an effective observation space.

2. An apparatus according to claim 1, wherein said illumination optical element is disposed between said light source and said image display element, and includes a first surface on which the illumination light emitted from said light source is incident, a second surface from which the illumination light emerges toward said image display element, and a third surface by which illumination light incident from the first surface is reflected toward the second surface, and
   the image light emerging from said image display element enters said illumination optical element through the second surface and emerges from the third surface.

3. An apparatus according to claim 1, wherein said observation optical element has a plurality of optical surfaces including at least one reflecting surface, and at least one of the optical surfaces is a rotationally asymmetrical surface.

4. An apparatus according to claim 1, wherein said light-shielding member is provided on at least at one of places between said light source and said illumination optical element, between said illumination optical element and said image display element, and between said illumination optical element and said observation optical element.

5. An apparatus according to claim 1, wherein said light-shielding member has undergone antireflection processing.

6. An apparatus according to claim 1, wherein
   said image display element includes a light control layer for controlling transmission/non-transmission of incident light in accordance with an input image signal and a reflecting layer formed on a lower surface side of the light control layer, and
   said light-shielding member is provided outside the effective image display area between the light control layer and the reflecting layer.

7. An apparatus according to claim 6, wherein said light-shielding member is formed by performing antireflection processing outside the effective image display area of the reflecting layer.

8. An apparatus according to claim 1, wherein said light-shielding member is provided on a surface of said image display element which is located outside the effective image display area.

9. An apparatus according to claim 1, wherein said light-shielding member is provided on an entrance/exit surface, in said illumination optical element, from which the illumination light emerges toward said image display element and on which image light from said image display element is incident.

10. An image display apparatus comprising:
    a light source for emitting illumination light;
    an image display element for displaying an image by reflecting the illumination light incident thereon;
    an illumination optical element which reflects the illumination light from said light source toward said image display element and through which image light from said image display element is transmitted;
    an observation optical element for guiding the image light transmitted through said illumination optical element to an eye of an observer; and
    a light-shielding member for blocking at least one of unnecessary light which is contained in illumination light from said light source and travels outside an effective image display area of said image display element and unnecessary light which is contained in image light from said image display element and travels outside an effective observation space,
    wherein said image display element includes a light control layer for controlling transmission/non-transmission of incident light in accordance with an input image signal and a reflecting layer formed on a lower surface side of the light control layer, said illumination optical element includes an entrance/exit surface from which the illumination light emerges toward said image display element and on which image light from said image display element is incident, and said light-shielding member is provided on the entrance/exit surface of said illumination optical element between the light control layer and the reflecting layer, or provided on a surface of said reflective image display element and the entrance/exit surface of said illumination optical element.

11. An apparatus according to claim 10, wherein said illumination optical element is disposed between said light source and said image display element, and includes a first surface on which the illumination light emitted from said light source is incident, a second surface from which the illumination light emerges toward said image display element, and a third surface by which the illumination light incident from the first surface is reflected toward the second surface, and the image light emerging from said image display element enters said illumination optical element through the second surface and emerges from the third surface.

12. An apparatus according to claim 10, wherein said observation optical element has a plurality of optical surfaces including at least one reflecting surface, and at least one of the optical surfaces is a rotationally asymmetrical surface.

13. An apparatus according to claim 10, wherein first and second light-shielding members are sequentially provided in a traveling direction of light reflected by said image display element, and letting w1 be a width of an opening of said first light-shielding member which corresponds to a vertical direction of the image display area of said image display element, w2 be a width of an opening of said second light-shielding member which corresponds to a vertical direction of the image display area of said image display element, δ be a distance between said light-shielding members, and θ be an incident angle of illumination light on said image display element, a relationship given by $$w2 > w1 + 2\delta\sin\theta$$

is satisfied.

14. An image display apparatus comprising:

a light source for emitting illumination light;

an image display element for displaying an image by reflecting the illumination light incident thereon;

an illumination optical element when reflects the illumination light from said light source toward said image display element and from which image light from said image display element pass is transmitted;

an observation optical element for guiding the image light transmitted through said illumination optical element to an eye of an observer; and a light-shielding member for blocking unnecessary light which is contained in illumination light from said light source and travels outside an effective image display area of said image display element, wherein said light-shielding member is provided between said light source and said illumination optical element.

15. An apparatus according to claim 14, wherein said illumination optical element is disposed between said light source and said image display element, and includes a first surface on which the illumination light emitted from said light source is incident, a second surface from which the illumination light emerges toward said image display element, and a third surface by which the illumination light incident from the first surface is reflected toward the second surface, and the image light emerging from said image display element enters said illumination optical element through the second surface and emerges from the third surface.

16. An apparatus according to claim 14, wherein said observation optical element has a plurality of optical surfaces including at least one reflecting surface, and at least one of the optical surfaces is a rotationally asymmetrical surface.

17. An apparatus according to claim 14, wherein an illumination length in a short side direction of an effective image display area on a surface of said image display element which is illuminated with the illumination light which is emitted from said light source and passes through said light-shielding member satisfies $$h = \{(D-\phi) \cdot b/2a + \phi/2\} \cdot \cos\theta$$

$$0.7L/2 \leq h \leq 3L/2$$

where h is the illumination length in the short side direction of the effective image display area on the surface of said image display element, L is a length of a short side of the effective image display area of said image display element, φ is an effective diameter of an emission area of said light source, D is a width of an opening of said light-shielding member which corresponds to the short side direction of the effective image display area of said image display element, θ is a tilt angle of said image display element with respect to a plane perpendicular to an optical axis defined by ray of light which illuminates a center of said image display element, a is a distance from said light source to said light-shielding member, and b is an equivalent length in air of the optical path from said light-shielding member to said image display element.

18. An apparatus according to claim 14, wherein a length of the opening of said light-shielding member which corresponds to a short side direction of the effective image display area of said image display element satisfies a condition given by $$1.0 \leq D \leq 22.9 \text{ (mm)}$$

and letting D be a length of a side of the opening of said light-shielding member which corresponds to the short side direction of the effective image display area of said image display element, the length D is given by $$\left\{ \frac{0.7L}{2\cos\theta} - \frac{\varphi}{2} - \left(\frac{b}{a}-1\right) \cdot |t| \right\} \cdot \frac{2a}{b} + \varphi \leq$$

$$D \leq \left\{ \frac{3L}{2\cos\theta} - \frac{\varphi}{2} - \left(\frac{b}{a}-1\right) \cdot |t| \right\} \cdot \frac{2a}{b} + \varphi$$

where L is a length of a short side of the effective image display area of said image display element, t is an amount of parallel translation of said light source from the optical axis, φ is an effective diameter of an emission area of said light source, θ is a tilt angle of said image display element with respect to a plane perpendicular to an optical axis defined by ray of light which illuminates a center of said image display element, a is a distance from said light source to said light-shielding member, b is an equivalent length in air of the optical path from said light-shielding member to said image display element, and t be an amount of parallel translation of said light source from an optical axis defined by ray of light which is emitted from said light source, transmitted through a center of the opening of said light-shielding member, and illuminates a center of said image display element, and the variables satisfy $$2.0 \leq \phi \leq 5.0 \text{ (mm)}$$

$$0.3 \leq \frac{b}{a} \leq 0.7$$

$$5.0 \leq L \leq 10.0 \text{ (mm)}$$

$$|t| \leq 5.0 \text{ (mm)}$$

$$0° \leq \theta \leq 30° \sqrt{3/2} \leq \cos\theta \leq 1.0.$$

19. An apparatus according to claim 14, wherein said light source is provided at a position parallelly shifted from an optical axis defined by ray of light which is emitted from said light source, transmitted through a center of the opening of said light-shielding member, and illuminates a center of said image display element.

20. An apparatus according to claim 14, wherein an illumination length in a short side direction of an effective image display area on a surface of said image display element which is illuminated with illumination light which is emitted from said light source and passes through said light-shielding member satisfies $$h=\{(D-\phi).b/2a+\phi/2+(b/a-1).|t|\}.\cos\theta$$

$$0.7L/2 \leq h \leq 3L/2$$

where h is the illumination length in the short side direction of the effective image display area on the surface of said image display element, t is an amount of parallel translation of said light source from the optical axis, L is a length of a short side of the effective image display area of said image display element, φ is an effective diameter of an emission area of said light source, D is a width of an opening of said light-shielding member which corresponds to the short side direction of the effective image display area of said image display element, θ is a tilt angle of said image display element with respect to a plane perpendicular to an optical axis defined by ray of light which illuminates a center of said image display element, a is a distance from said light source to said light-shielding member, and b is an equivalent length in air of the optical path from said light-shielding member to said image display element.

21. An apparatus according to claim 14, wherein a length of a side of an opening of said light-shield member which corresponds to a long side direction of the effective image display area of said image display element located at a longer one of paths of light beams which are emitted from said light source, reflected by a reflecting surface of said illumination optical element, and reach said image display element, is shorter than a length of a side of the opening corresponding to the long side direction of the effective image display area of said image display element located at a shorter one of the paths from said light source to said image display element.

22. An apparatus according to claim 14, wherein
said illumination optical element is disposed between said light source and said image display element, and includes a first surface on which the illumination light emitted from said light source is incident, a second surface from which the illumination light emerges toward said image display element, and a third surface by which the illumination light incident from the first surface is reflected toward the second surface, and
the image light emerging from said image display element enters said illumination optical element through the second surface and emerges from the third surface.

23. An apparatus according to claim 14, wherein said observation optical element has a plurality of optical effect surfaces including at least one reflecting surface, and at least one of the optical surfaces is a rotationally asymmetrical surface.

24. An image display apparatus comprising:
a light source for emitting illumination light;
an image display element for displaying an image by reflecting the illumination light incident thereon;
an illumination optical element which reflects the illumination light from said light source toward said image display element and through which image light from said image display element is transmitted;
an observation optical element for guiding the image light transmitted through said illumination optical element to an eye of an observer;
a light-shielding member for blocking at least one of unnecessary light which is contained in illumination light from said light source and travels outside an effective image display area of said image display element and unnecessary light which is contained in image light from said image display element and travels outside an effective observation space; and
a holding member for holding at least one of said light source, said image display element, said illumination optical element, and said observation optical element,
wherein said light-shielding member is integrally formed with said holding member.

25. An apparatus according to claim 23, wherein said illumination optical element is disposed between said light source and said image display element, and includes a first surface on which the illumination light emitted from said light source is incident, a second surface from which the illumination light emerges toward said image display element, and a third surface by which the illumination light incident from the first surface is reflected toward the second surface, and
image light emerging from said image display element enters said illumination optical element through the second surface and emerges from the third surface.

26. An apparatus according to claim 24, wherein said observation optical element has a plurality of optical surfaces including at least one reflecting surface, and at least one of the optical effect surfaces is a rotationally asymmetrical surface.

27. An image display system including an image display apparatus and an image information supply apparatus for supplying image information to said image display apparatus, comprising:
a light source for emitting illumination light;
an image display element for displaying an image by reflecting the illumination light incident thereon;
an illumination optical element which reflects the illumination light from said light source toward said image display element and through which image light from said image display element is transmitted;
an observation optical element for guiding the image light transmitted through said illumination optical element to an eye of an observer; and a light-shielding member for blocking at least one of unnecessary light which is contained in the illumination light from said light source and travels outside an effective image display area of said image display element and unnecessary light which is contained in image light from said image display element and travels outside an effective observation space.

28. A system according to claim 27, wherein said illumination optical element is disposed between said light source and said image display element, and includes a first surface on which the illumination light emitted from said light source is incident, a second surface from which the illumination light emerges toward said image display element, and a third surface by which the illumination light incident from the first surface is reflected toward the second surface, and image light emerging from said image display element enters said illumination optical element through the second surface and emerges from the third surface.

29. A system according to claim 27, wherein said observation optical element has a plurality of optical surfaces including at least one reflecting surface, and at least one of the optical surfaces is a rotationally asymmetrical surface.

30. A system according to claim 27, wherein said image information supply apparatus comprises any one of a personal computer, a DVD player, a video player, and a television receiver.

31. An image display element for displaying an image by reflecting incident light in an observation side space, comprising:

a light control layer for controlling transmission/non-transmission of illumination light in accordance with an input image signal;

a reflecting layer formed on a rear surface side of said light control layer; and a light-shielding member for blocking incident light, of obliquely applied light, which travels outside an effective image display area of said image display element, and also blocking reflected light outside an effective observation space of the observation side space.

32. An element according to claim 31, wherein said light-shielding member is provided outside the effective image display area between said light control layer and said reflecting layer.

33. An element according to claim 31, wherein said light-shielding member is formed by performing antireflection processing outside the effective image display area of said reflecting layer.

34. An element according to claim 31, wherein said light-shielding member is provided outside the effective image display area on a surface of said element.

* * * * *

UNITED STATES PATENT AND TRADEMARK OFFICE
CERTIFICATE OF CORRECTION

PATENT NO. : 6,646,809 B1
DATED : November 11, 2003
INVENTOR(S) : Toshiki Ishino et al.

It is certified that error appears in the above-identified patent and that said Letters Patent is hereby corrected as shown below:

Column 16,
Line 20, "the+LCD" should read -- the LCD --.

Column 23,
Line 51, "when" should read -- which --.

Column 25,
Line 1, "be" should read -- is --.

Signed and Sealed this

Twenty-ninth Day of June, 2004

JON W. DUDAS
*Acting Director of the United States Patent and Trademark Office*